(12) United States Patent
Kano et al.

(10) Patent No.: US 9,332,744 B2
(45) Date of Patent: May 10, 2016

(54) FISHING SPINNING REEL

(71) Applicant: GLOBERIDE, INC., Higashi Kurume-shi, Tokyo (JP)

(72) Inventors: Shuta Kano, Tokyo (JP); Manabu Matsuhashi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/345,376

(22) PCT Filed: May 24, 2013

(86) PCT No.: PCT/JP2013/064465
§ 371 (c)(1),
(2) Date: Mar. 17, 2014

(87) PCT Pub. No.: WO2013/180026
PCT Pub. Date: Dec. 5, 2013

(65) Prior Publication Data
US 2015/0069162 A1    Mar. 12, 2015

(30) Foreign Application Priority Data

May 29, 2012 (JP) ................................ 2012-122369
May 29, 2012 (JP) ................................ 2012-122371

(51) Int. Cl.
*A01K 89/01* (2006.01)
*A01K 89/00* (2006.01)

(52) U.S. Cl.
CPC .............. *A01K 89/006* (2013.01); *A01K 89/01* (2013.01)

(58) Field of Classification Search
CPC . A01K 89/004; A01K 89/006; A01K 89/009; A01K 89/01
USPC .......................................... 242/282, 283, 284
See application file for complete search history.

(56) References Cited

U.S. PATENT DOCUMENTS 5,118,048 A * 6/1992 Childre et al. ................. 242/245
5,308,020 A * 5/1994 Kawabe ........................ 242/284
(Continued)

FOREIGN PATENT DOCUMENTS

EP        1358795 A1 * 11/2003 ............. A01K 89/01
JP       11-299398       11/1999
(Continued)

OTHER PUBLICATIONS

Chinese Office Action dated Nov. 4, 2014 for Appln. No. 201380003292.8.
(Continued)

*Primary Examiner* — Emmanuel M Marcelo
(74) *Attorney, Agent, or Firm* — Pillsbury Winthrop Shaw Pittman, LLP

(57) ABSTRACT

According to an embodiment, a fishing spinning reel includes an assembly structure of a handle with which to prevent backlash at a handle part and facilitate an assembly operation and a folding operation of the handle part. The fishing spinning reel according to the embodiment includes a driving shaft integrated with a drive gear, a handle arm rotating in response to an operation of a handle, a handle shaft axially supporting the handle arm in a pivotable manner on one end, rotating in response to the rotation of the handle arm, and divided from the driving shaft in an axial direction, and a tubular member connected to each of the driving shaft and the handle shaft in an integrally rotatable manner, and including a first engagement portion engaged with the driving shaft and a second engagement portion engaged with the handle arm in a state where the handle is used.

8 Claims, 22 Drawing Sheets

(56) References Cited

U.S. PATENT DOCUMENTS

| | | | |
|---|---|---|---|
| 5,381,979 A * | 1/1995 | Furomoto | 242/224 |
| 5,538,198 A * | 7/1996 | Hirano et al. | 242/283 |
| 5,690,289 A | 11/1997 | Takeuchi et al. | |
| 2004/0140385 A1 | 7/2004 | Nishikawa et al. | |
| 2006/0071107 A1* | 4/2006 | Ochiai et al. | 242/283 |
| 2006/0175448 A1* | 8/2006 | Sugawara et al. | 242/224 |
| 2008/0191079 A1* | 8/2008 | Sugahara et al. | 242/230 |
| 2010/0301150 A1* | 12/2010 | Law et al. | 242/283 |
| 2012/0097779 A1* | 4/2012 | Inoue | 242/249 |

FOREIGN PATENT DOCUMENTS

| | | |
|---|---|---|
| JP | 2004-229573 | 8/2004 |
| JP | 2008-193949 | 8/2008 |
| JP | 2008-237081 | 10/2008 |
| JP | 2011-041495 | 3/2011 |

OTHER PUBLICATIONS

International Search Report for PCT/JP2013/064465.

Japanese Office Action dated Sep. 17, 2015 for Appln. No. 2012-122371.

Chinese Office Action dated May 6, 2015 for Appln. No. 201380003292.8.

Extended European Search Report dated Jan. 22, 2016 for Appln. No. 13797946.4.

* cited by examiner

FISHING SPINNING REEL

CROSS-REFERENCE TO RELATED APPLICATIONS

This is the U.S. National Stage of PCT/JP2013/064465, filed May 24, 2013, which in turn claims priority to Japanese Patent Application Nos. 2012-122369, filed May 29, 2012 and 2012-122371, filed May 29, 2012, the entire contents of all applications are incorporated herein by reference in their entireties.

TECHNICAL FIELD

The present invention relates to a fishing spinning reel and, more particularly, to a fishing spinning reel characterized by an assembly structure of a handle.

BACKGROUND ART

A fishing spinning reel is configured to include a rotor rotated in association with a winding and rotation operation of a handle and a spool moving forward and backward, and a rotational driving force of the handle is transmitted to a drive gear via a handle shaft such that the drive gear is rotated to drive the rotor and the spool. In addition, a handle arm of the above-described handle is configured to be capable of being folded with respect to the handle shaft such that the handle can be small in size.

When the handle is a folding type as described above, backlash is likely to be generated at connection parts of the handle arm, the handle shaft, and the drive gear. As such, PTL 1 discloses an assembly structure of the handle in which the handle arm is axially supported by the handle shaft in a pivotable manner and the backlash is prevented while a gear shaft (driving shaft cylinder) of the drive gear is driven. According to the assembly structure of the handle, a tubular member (collar) into which the handle shaft axially supporting the handle arm in a pivotable manner at a tip is inwardly fitted in such a manner as not to be capable of being relatively rotated is arranged, and engagement portions respectively engaged with the handle arm and the gear shaft are disposed in both end portions of the tubular member.

CITATION LIST

Patent Literature

PTL 1: Japanese Unexamined Patent Application Publication No. 2008-193949

SUMMARY

Technical Problem

According to the above-described known technique, the handle arm and the gear shaft are respectively engaged with both of the end portions of the tubular member fitted with the handle shaft not to be rotated and the handle shaft is fitted into the gear shaft not to be rotated such that a transmission system for a driving force from the handle arm to the gear shaft is in a state of integration along with the tubular member, and thus it is difficult to maintain a play (gap•cross) in respective engagement parts and high-accuracy dimensional control is required for each of the members. In other words, positioning accuracy (cross) at each of the engagement parts is required, causing an assembly operation and a folding operation of a handle part to be difficult. In addition, because it is difficult to maintain a constant backlash state in the entire tubular member, a large load is likely to be imposed in the direction of rotation in any of the engagement parts. As a result, the backlash is likely to be generated in the axial direction at the part.

The present invention has been made in view of the above-described problems, and an object thereof is to prevent backlash at a handle part. In addition, another object of the present invention is to provide a fishing spinning reel including an assembly structure of a handle with which an assembly operation and a folding operation of the handle part are facilitated.

Solution to Problem

In order to achieve the above-described object, a fishing spinning wheel according to an embodiment of the present invention includes a driving shaft integrated with a drive gear, a handle arm rotating in response to an operation of a handle, a handle shaft axially supporting the handle arm in a pivotable manner on one end, rotating in response to the rotation of the handle arm, and divided from the driving shaft in an axial direction, and a tubular member connected to each of the driving shaft and the handle shaft in an integrally rotatable manner, and including a first engagement portion engaged with the driving shaft and a second engagement portion engaged with the handle arm in a state where the handle is used.

In the fishing spinning reel having the above-described configuration, the first engagement portion and the second engagement portion are disposed in the tubular member and the engagement portions are engaged with the driving shaft and the handle arm in a state where the handle is used, and thus backlash can be suppressed at a part reaching the driving shaft from the handle arm. In addition, a driving force from the handle arm is configured to be transmitted to a driving shaft side via the connection between the handle shaft and the tubular member in a state of being divided in the axial direction from the driving shaft and the connection between the driving shaft and the tubular member in a state of being divided in the axial direction from the handle shaft, and thus a transmission system for the driving force from the handle is not in a state of integration along with the tubular member. Accordingly, the first engagement portion and the second engagement portion of the tubular member do not necessarily have to maintain accuracy within a constant range of play (gap•cross) and the play is allowed independently in each of the engagement portions. As such, there is room for dimension control, and the assembly operation and the folding operation of the handle part are facilitated. In addition, a load in the direction of rotation may be unlikely to be imposed to the first engagement portion and the second engagement portion of the tubular member, and thus the backlash in the axial direction can be effectively suppressed.

In addition, in order to achieve the above-described object, a fishing spinning reel according to another embodiment of the present invention includes a driving shaft integrated with a drive gear, a handle arm rotating in response to an operation of a handle, a handle shaft axially supporting the handle arm in a pivotable manner on one end, rotating in response to the rotation of the handle arm, and inwardly fitted into the driving shaft in an integrally rotatable manner, and a tubular member into which the handle shaft is inserted in a rotatable manner, the tubular member including a first engagement portion engaged with the driving shaft and a second engagement portion engaged with the handle arm in a state where the handle is used.

In the fishing spinning reel according to the above-described configuration, the first engagement portion and the second engagement portion are disposed in the tubular member and the engagement portions are engaged with the driving shaft and the handle arm in a state where the handle is used, and thus backlash can be suppressed at a part reaching the driving shaft from the handle arm. In addition, a driving force from the handle arm is transmitted from the handle shaft inwardly fitted to be integrally rotatable with the driving shaft and the handle shaft is inserted to be rotatable with respect to the tubular member, and thus a transmission system for the driving force from the handle is not in a state of integration along with the tubular member. Accordingly, the first engagement portion and the second engagement portion of the tubular member do not necessarily have to maintain accuracy within a constant range of play (gap•cross) and the play is allowed independently in each of the engagement portions. As such, there is room for dimension control, and the assembly operation and the folding operation of the handle part are facilitated. In addition, a load in the direction of rotation may be unlikely to be imposed to the first engagement portion and the second engagement portion of the tubular member, and thus the backlash in the axial direction can be effectively suppressed.

In addition, in order to achieve the above-described object, a fishing spinning reel according to still another embodiment of the present invention includes a driving shaft integrated with a drive gear, a handle arm rotating in response to an operation of a handle, a handle shaft axially supporting the handle arm in a pivotable manner in one end portion, rotating in response to the rotation of the handle arm, and arranged on one end of the driving shaft, a tubular member interposed between the driving shaft and the handle arm and arranged to surround at least a part of the handle shaft, and a connection shaft screwed with and inserted into the other end portion of the handle shaft from the other end of the driving shaft, in which supporting surfaces having a tapered shape are formed at respective interface sites of the handle arm and the tubular member in surface contact with each other by an axial-direction tightening force caused by screwing of the handle shaft and the connection shaft, and the handle arm and the tubular member are relatively displaced along the supporting surfaces in contact with each other by the axial-direction tightening force such that the handle arm and the handle shaft are pressed against and fixed to each other.

In the fishing spinning reel according to the above-described configuration, the tubular member and the handle arm have respective supporting surfaces with a tapered shape at the interface sites where these are in surface contact with each other by the axial-direction tightening force caused by the screwing between the handle shaft and the connection shaft and the handle arm and the tubular member are relatively displaced along the supporting surfaces in contact with each other by the axial-direction tightening force such that the handle arm and the handle shaft are pressed against and fixed to each other, and thus the backlash between the handle arm and the handle shaft is automatically and reliably removed by using the existing components of the assembly structure of the handle (without having to provide an additional component) and just by assembling the components of the assembly structure of the handle. In other words, the minimum clearance required for the assembly can be ensured during the assembly of the components of the assembly structure of the handle and the clearance can be removed to prevent the backlash when the assembly is completed. In other words, the backlash between the components can be reliably suppressed without affecting the ease of assembly of the components of the assembly structure of the handle when the assembly is completed.

In the above-described configuration, it is preferable that the tubular member and the handle shaft be further pressed against and fixed to each other by the relative displacement between the handle arm and the tubular member along the supporting surfaces in contact with each other by the axial-direction tightening force. This is useful in that the backlash of the entire assembly structure (a plurality of sites) of the handle can be effectively removed through a single assembly operation. In addition, it is preferable that the outer surface of the handle arm and the outer surface of the tubular member be flush in a state where the handle shaft is pressed against and fixed to the handle arm or the tubular member by the relative displacement between the handle arm and the tubular member. In this manner, the assembly structure of the handle with an excellent appearance can be achieved.

Advantageous Effects of Invention

According to various embodiments of the present invention, it is possible to provide a fishing spinning reel including an assembly structure of a handle with which backlash at a handle part can be prevented and an assembly operation and a folding operation of the handle part are facilitated.

DESCRIPTION OF EMBODIMENTS

Hereinafter, various embodiments of a fishing spinning reel according to the present invention will be described.
FIGS. 1 to 8 are views illustrating a fishing spinning reel 1 according to a first embodiment of the present invention. FIG.

Figure 1:
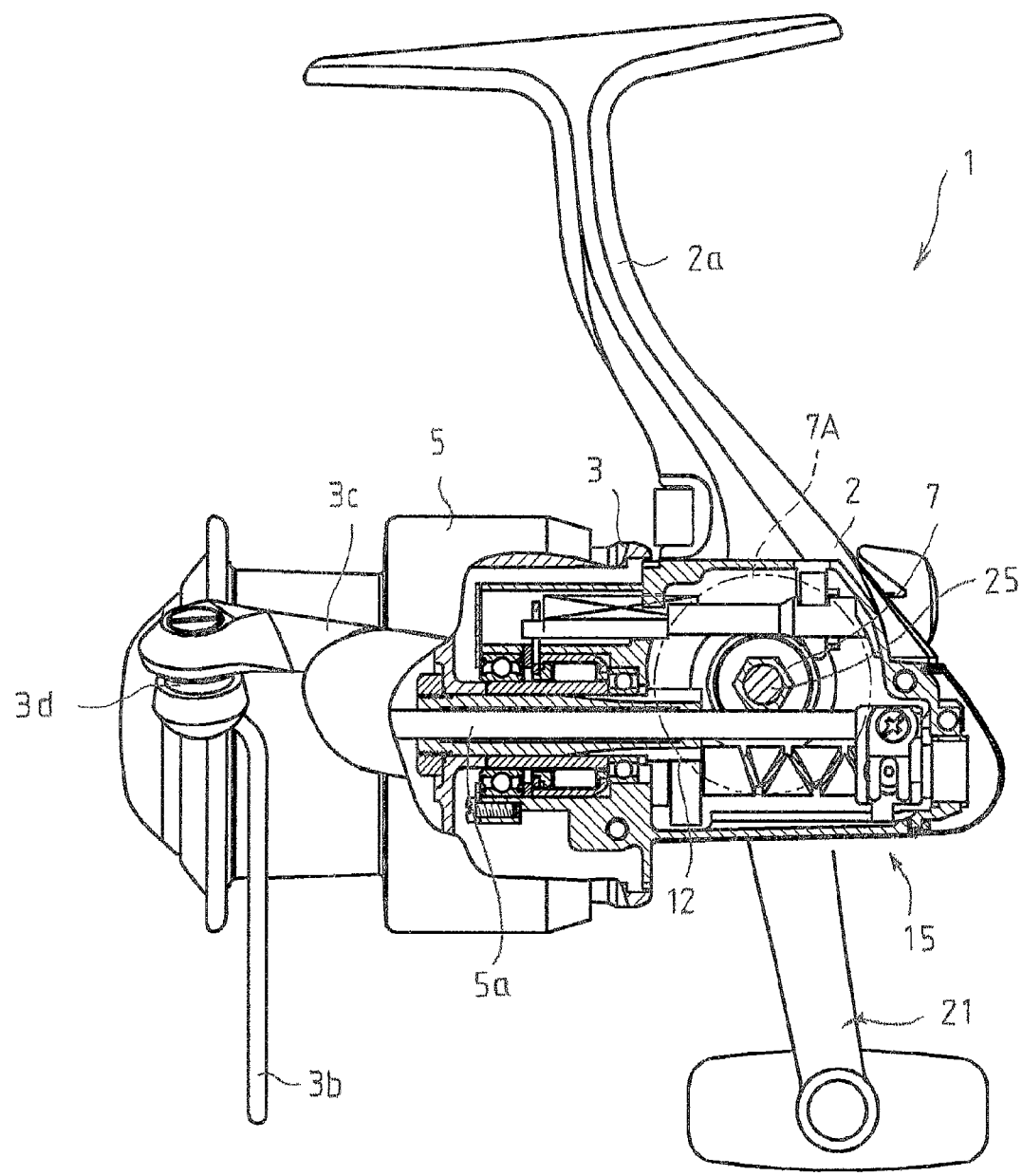
FIG. 1 is a partial sectional view illustrating a first embodiment of a fishing spinning reel according to the present invention.
Figure 2:
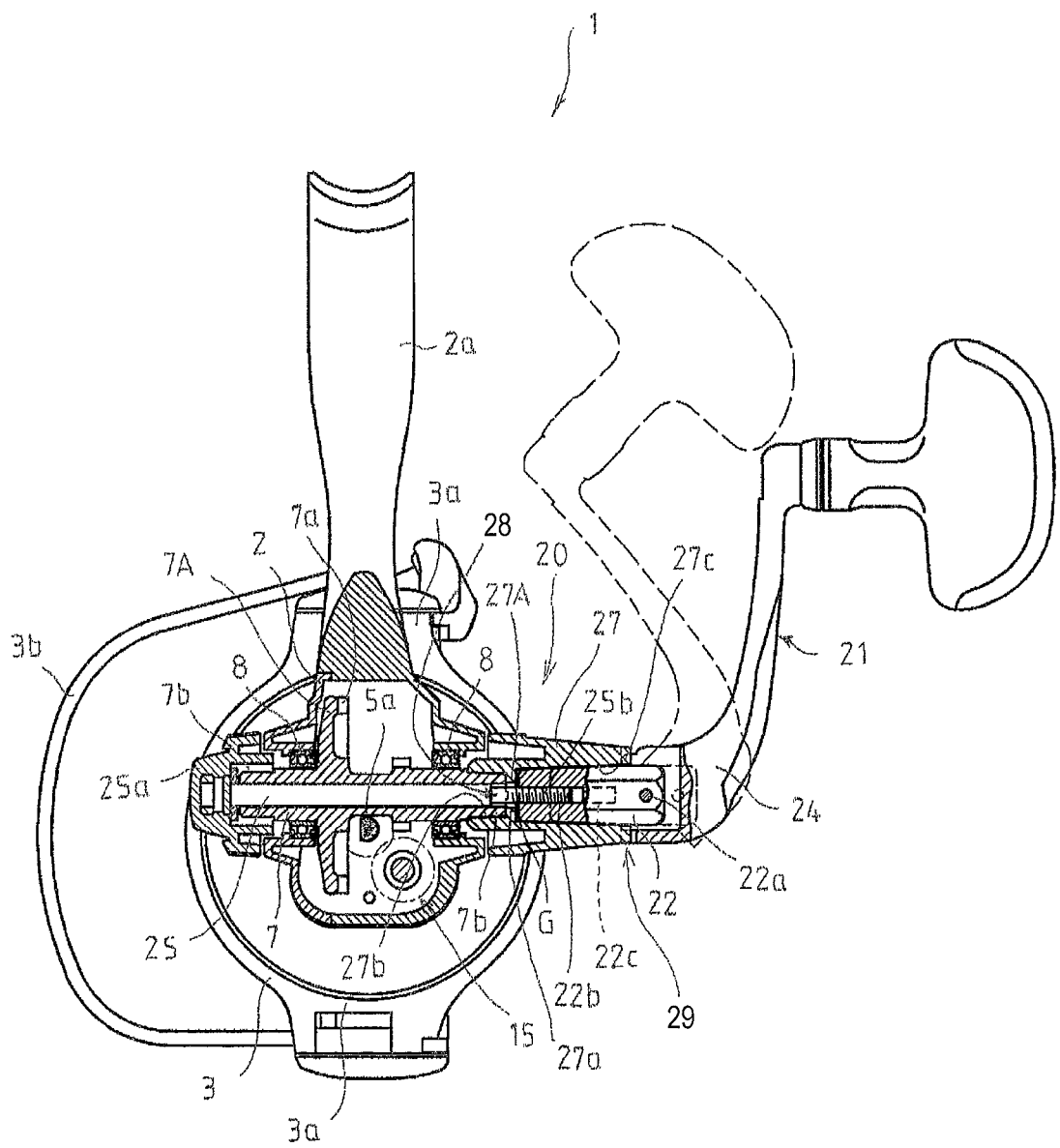
FIG. 2 is a partial sectional view of the fishing spinning reel illustrated in FIG. 1 viewed from a rear side.
Figure 3:
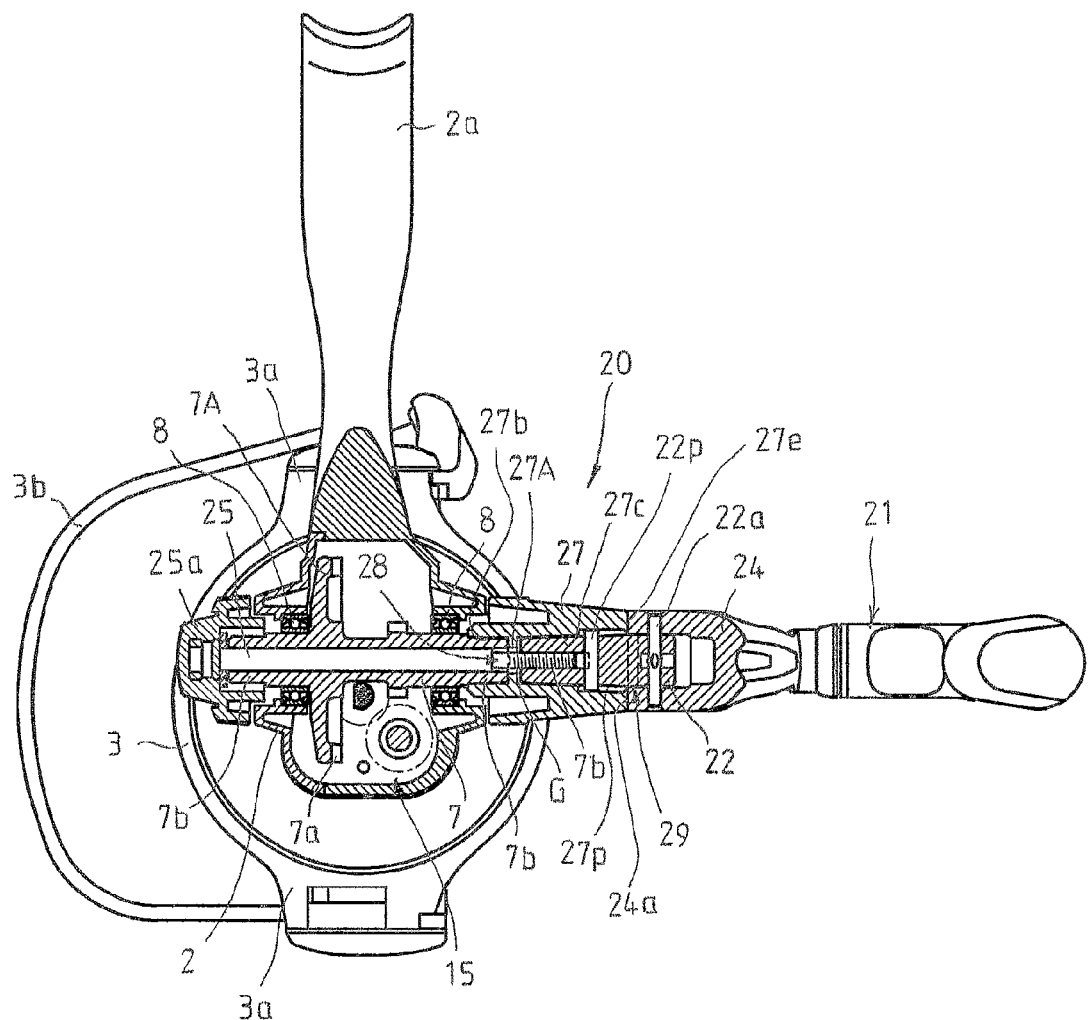
FIG. 3 is a view illustrating a state where a handle of the fishing spinning reel illustrated in FIG. 2 is rotated by 90°.
Figure 4:
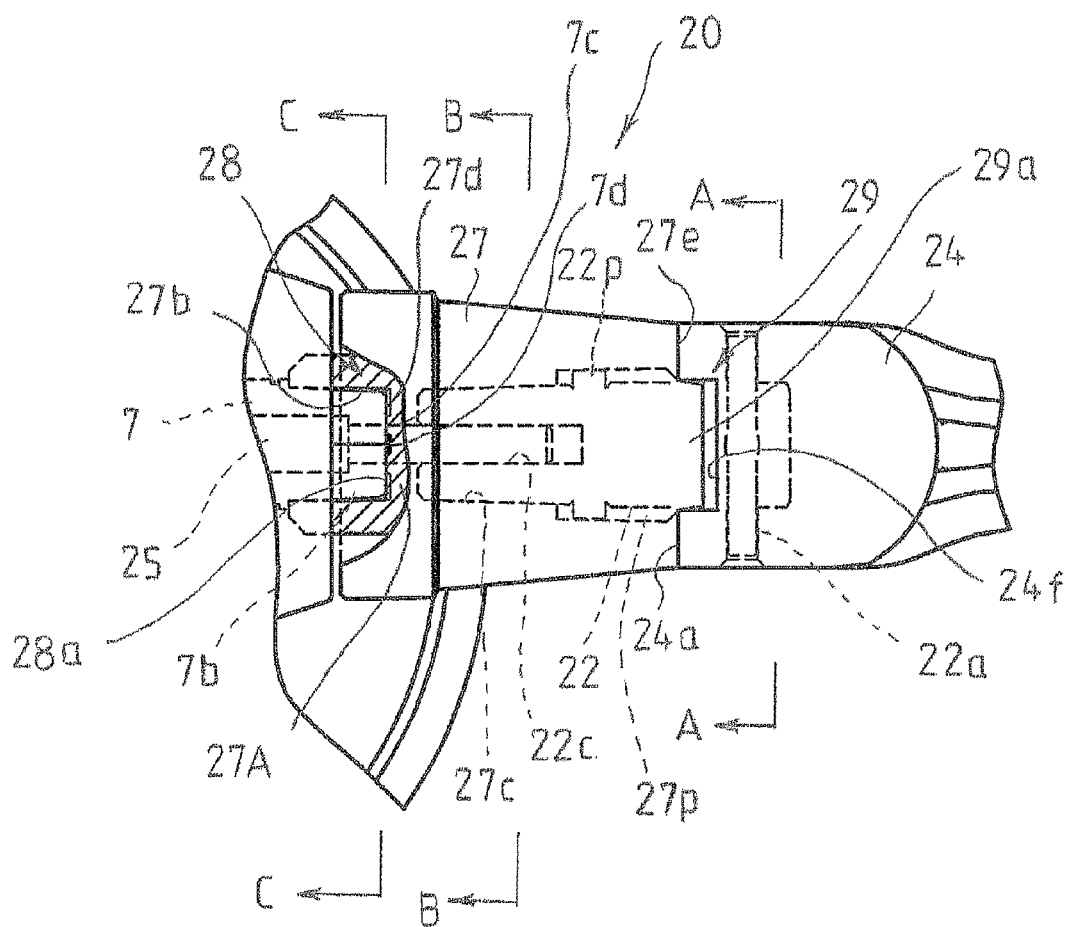
FIG. 4 is an enlarged view of a main part of an assembly part of the handle.
Figure 5:
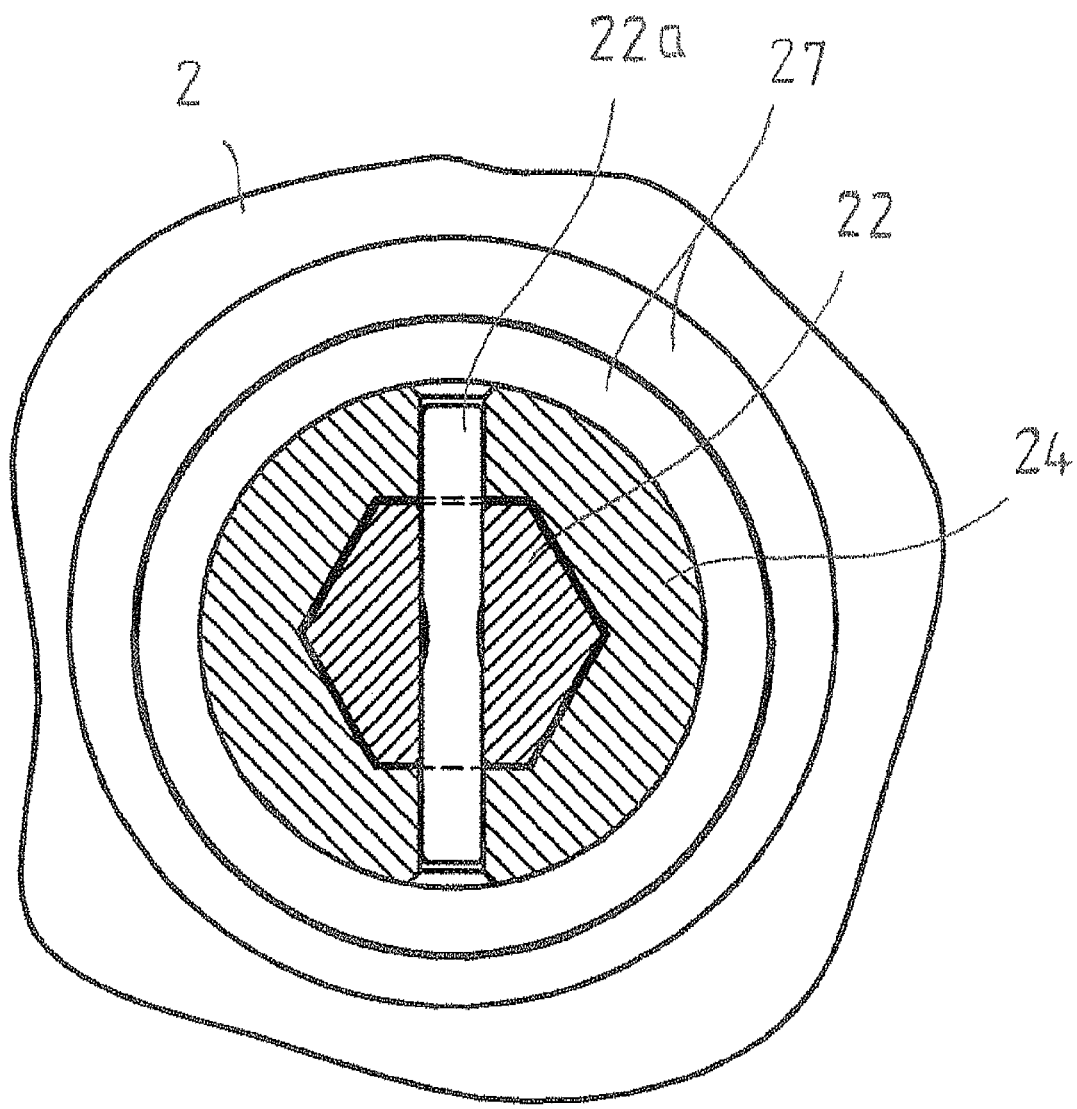
FIG. 5 is a sectional view taken along line A-A of FIG. 4.
Figure 6:
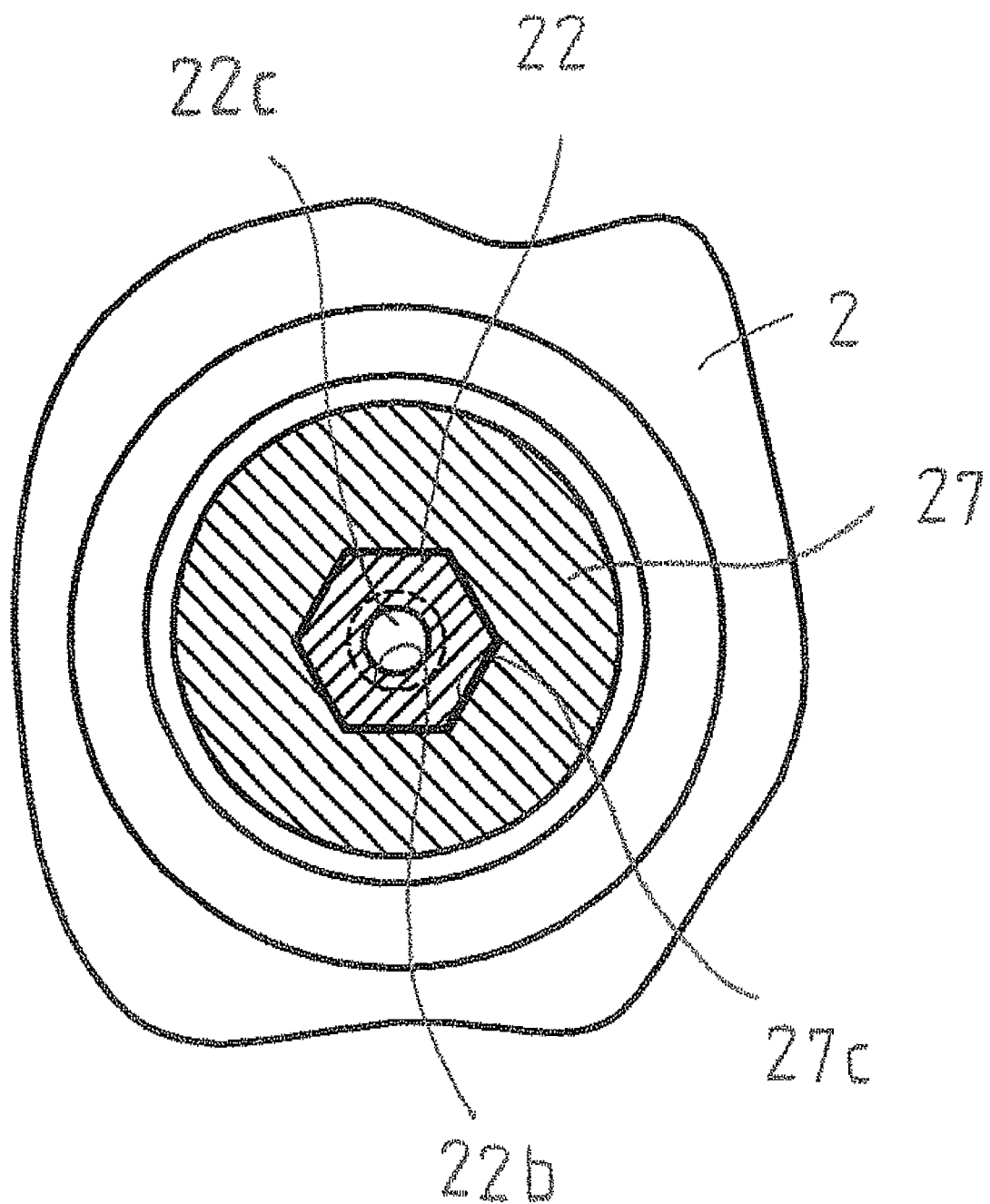
FIG. 6 is a sectional view taken along line B-B of FIG. 4.
Figure 7:
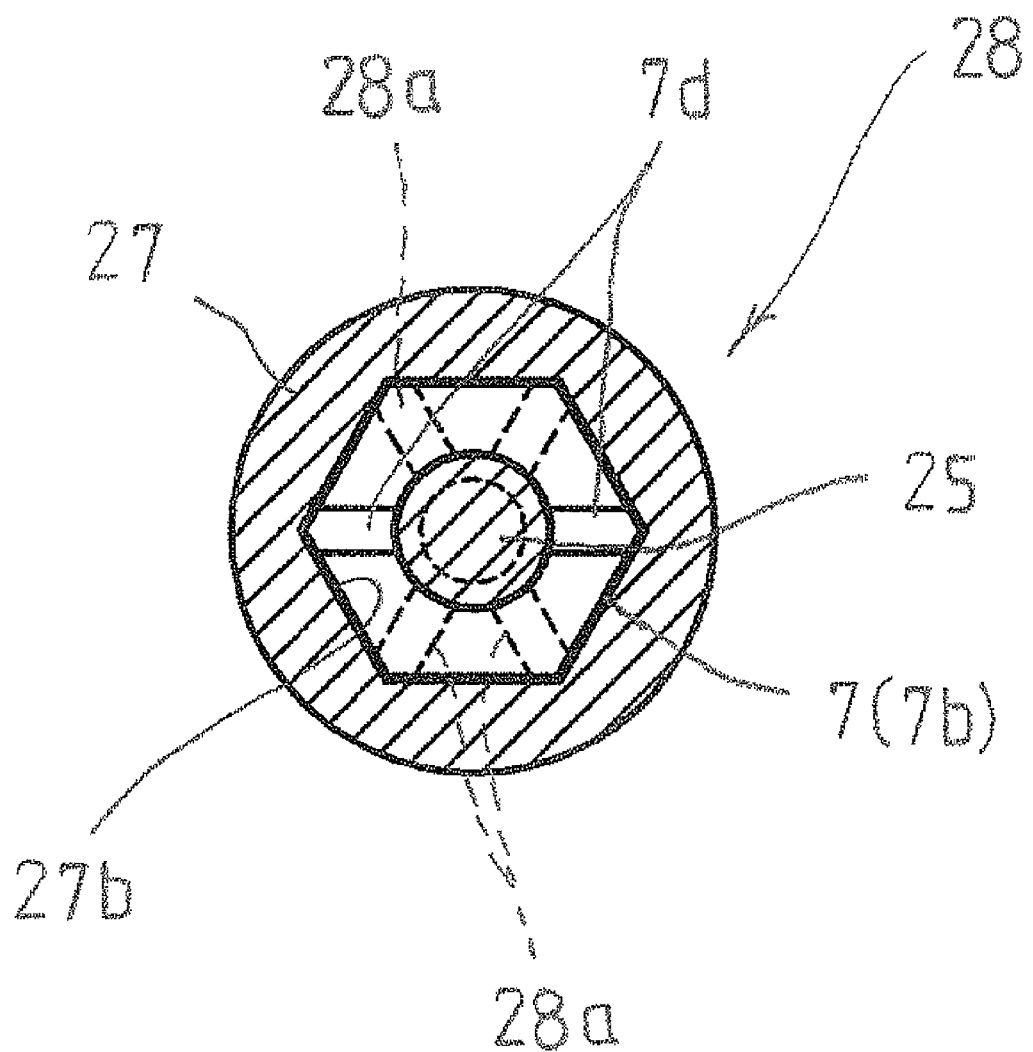
FIG. 7 is a sectional view taken along line C-C of FIG. 4.
Figure 8:
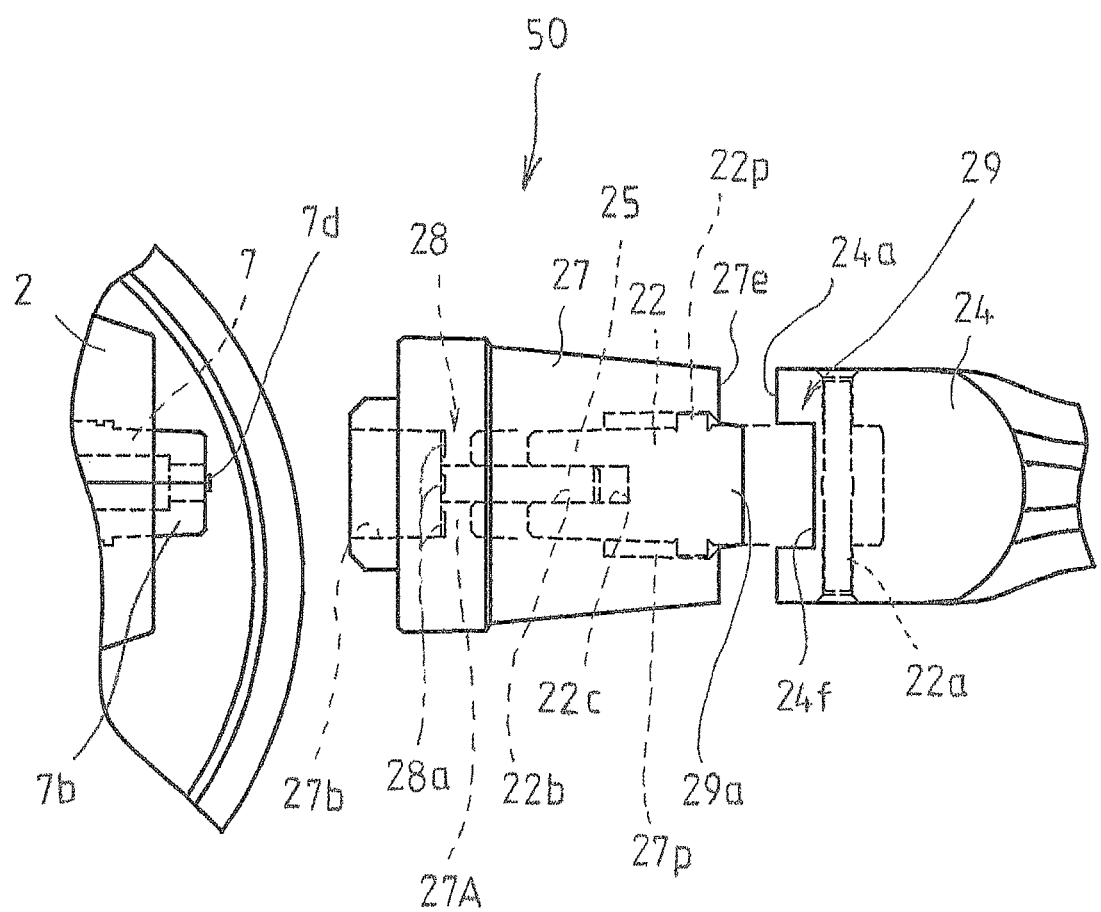
FIG. 8 is a view illustrating a state where the main part of the assembly part of the handle is disassembled.

1 is a partial sectional view. FIG. 2 is a partial sectional view of the fishing spinning reel 1 illustrated in FIG. 1 viewed from a rear side. FIG. 3 is a view illustrating a state where a handle of the fishing spinning reel 1 illustrated in FIG. 2 is rotated by 90°. FIG. 4 is an enlarged view of a main part of an assembly part of the handle. FIG. 5 is a sectional view taken along line A-A of FIG. 4. FIG. 6 is a sectional view taken along line B-B of FIG. 4. FIG. 7 is a sectional view taken along line C-C of FIG. 4. FIG. 8 is a view illustrating a state where the main part of the assembly part of the handle is disassembled.

Firstly, an overall configuration of the fishing spinning reel 1 will be described with reference to FIGS. 1 and 2.

The fishing spinning reel 1 may include a reel main body 2 where a rod mounting portion 2a that may be mounted on a fishing rod may be formed, a rotor 3 that may be rotatably arranged in a front of the reel main body 2, and a spool 5 that may be arranged to be capable of moving forward and backward in synchronization with a rotational motion of the rotor 3. A drive gear (face gear) 7A that may be integrated with a driving shaft (gear shaft) 7 may be arranged to be rotatable via a pair of bearings 8 in the reel main body 2. As illustrated in the drawings, the driving shaft 7 of this embodiment may be formed to have a tubular overall shape, and thus may be referred to as a "driving shaft cylinder" hereinafter.

As will be described later, the driving shaft cylinder 7 may be configured to be driven to rotate by an integrally rotating handle shaft 22 through a rotation operation of a handle 21, and a pinion gear 12 that may extend in a direction orthogonal to the driving shaft cylinder 7 with the rotor 3 being fixed not to be rotated may be engaged with a tooth portion 7a of the drive gear 7A integrated with the driving shaft cylinder 7. A spool shaft 5a that may support the spool 5 may be inserted into the pinion gear 12 and a known oscillating mechanism 15 may be engaged with a rear end of the spool shaft 5a such that the spool shaft 5a may be driven to reciprocate in a front-back direction in response to a winding operation of the handle 21.

A pair of supporting arms 3a may be formed to face each other at an interval of approximately 180° in a cylindrical portion of the rotor 3, and a bale supporting member 3c on which a base end portion of a bale 3b may be mounted may be reversibly supported between a fishing line release position and a fishing line winding position in respective front end portions. In this case, one of the base end portions of the bale 3b may be mounted on a fishing line guide section 3d that may be integrally disposed in the bale supporting member 3c.

According to the above-described configuration, the rotor 3 may be driven to rotate via the drive gear 7A that may be driven to rotate by the handle shaft 22 and the pinion gear 12 through the winding operation of the handle 21 and the spool 5 may be moved forward and backward via the oscillating mechanism 15, and thus a fishing line may be uniformly wound around the spool 5 via the fishing line guide section 3d. In addition, in a case where the fishing line is released, the bale supporting member 3c may be operated to be reversed to the fishing line release position from the fishing line winding position illustrated in FIG. 1 such that the fishing line may be removed from the fishing line guide section 3d and the fishing rod may be swung downward.

Next, a structure of the assembly part of the handle will be described.

An assembly structure 20 of the assembly part of the handle may have a configuration in which the handle 21 that may have a handle arm 24 which may be axially supported in a pivotable manner on one end of the handle shaft 22 by a supporting shaft (pivotal support pin) 22a may be folded from a state illustrated with a solid line in FIG. 2 to a state illustrated with a dotted line in FIG. 2. In this embodiment, the assembly structure 20 may have a connection shaft 25 that may be inserted in a relatively rotatable manner into the driving shaft cylinder 7, and a tubular member (collar member) 27 that may be arranged over the driving shaft cylinder 7 and the handle shaft 22.

The connection shaft 25 may be configured to be capable of being inserted into the driving shaft cylinder 7 from a side of either one of end portions 7b of the driving shaft cylinder 7 projecting from the reel main body 2 depending on right-handed or left-handed use and, as illustrated in FIG. 2, may be inserted into the driving shaft cylinder 7 from, for example, a left side of the reel main body 2 to allow a rotation operation of a cap (rotating knob) 25a disposed in a left side end portion of the connection shaft 25 and to allow the handle 21 to be fixed in a state of use (right-handed use is set in FIG. 2). In this case, a male threaded portion 25b may be formed at a projecting end of the connection shaft 25 to be screwed with a female threaded portion 22b formed in a central shaft hole 22c of the handle shaft 22 such that the handle shaft 22 may be moved in an axial direction.

The tubular member 27 of this embodiment may be configured and arranged to cover an outer surface within a constant range in the axial direction from the end portion (end portion 7b projecting from the reel main body) of the driving shaft cylinder 7 on a handle shaft 22 side and an outer surface within a constant range (range to a front of the supporting shaft 22a) in the axial direction from the end portion of the handle shaft 22 on a drive gear 7A side (driving shaft cylinder 7 side), and the driving shaft cylinder 7 and the handle shaft 22 may be arranged to be divided in the axial direction within the range covered by the tubular member 27. In other words, the driving shaft cylinder 7 and the handle shaft 22 may be arranged in a discontinuous state without overlapping with each other in the axial direction (without being fitted into each other). In this embodiment, the end portions of both of the members may be separated from each other by a partitioning wall 27A of the tubular member 27, which will be described later. However, the end surfaces may be configured to be in contact with each other as well.

In a hollow portion of the tubular member 27, the partitioning wall 27A that may be approximately orthogonal to the axial direction may be formed at a position moved to the drive gear 7A side from a middle of the axial direction thereof, and an opening 27a may be formed at an approximately center of the partitioning wall 27A such that the male threaded portion 25b of the connection shaft 25 may be inserted. In addition, the driving shaft cylinder 7 and the handle shaft 22 may be partitioned in the axial direction by the partitioning wall 27A. In this embodiment, the partitioning wall 27A and the handle shaft 22 may have a relationship in which an axial-direction gap G may be generated therebetween even when the connection shaft 25 is tightened.

Each of both inner circumferential surfaces (inner circumferential surface 27b on the drive gear 7A side from the partitioning wall 27A and inner circumferential surface 27c on a handle arm 24 side from the partitioning wall 27A) with which the tubular member 27 may be configured to be hollow may have a polygonal cross-sectional shape, and the end portion 7b of the driving shaft cylinder 7 that may be formed to have a polygonal cross-sectional shape and the handle shaft 22 that may be formed to have a polygonal cross-sectional shape may be respectively fitted into these parts not to be rotated. In other words, the handle shaft 22 may be connected with the tubular member 27 in an integrally rotatable manner by this fitted structure, and the driving shaft cylinder 7 divided from the handle shaft 22 may be connected with the tubular member 27 in an integrally rotatable manner by this fitted structure. In addition, at a part where the tubular member 27 and the handle shaft 22 may be fitted with each other, the handle shaft 22 (and the hollow portion of the tubular member 27) may have a tapered shape with a diameter gradually decreasing toward the drive gear 7A side from the handle arm 24 side.

A first engagement portion 28 that may be engaged with the driving shaft cylinder 7 in a state where the handle is used and a second engagement portion 29 that may be engaged with the handle arm 24 in a state where the handle is used may be formed in the tubular member 27.

The first engagement portion 28 according to this embodiment may be formed on a side surface 27d of the partitioning wall 27A on the drive gear 7A side, and may be configured to have a plurality of concave portions 28a (for example, six concave portions 28a formed at an interval of approximately 60°) which may extend in a radial direction from the opening 27a and may be formed at regular intervals in a circumferential direction as illustrated in FIG. 7. In addition, a plurality of convex portions 7d (for example, two convex portions 7d at an interval of approximately) 180° that can be engaged with the concave portions 28a may be formed on an open end surface 7c of the driving shaft cylinder 7 on the partitioning wall 27A side. The convex portions 7d can be engaged with the plurality of concave portions 28a formed on the side surface 27d of the partitioning wall 27A. In this case, it is preferable that the concave portions 28a and the convex portions 7d have a tapered shape (have an engagement relationship between tapered surfaces) in the axial direction at an engagement part, and the engagement relationship can facilitate the engagement during a tightening operation and can suppress backlash in the axial direction.

In addition, the second engagement portion 29 according to this embodiment may be formed on an end surface 27e of the tubular member 27 on the handle arm 24 side, and may be configured to have a plurality of convex portions 29a (for example, two convex portions 29a formed at an interval of approximately 180°) which may extend in the radial direction from the opening 27a and may be formed at regular intervals in the circumferential direction. In addition, a plurality of concave portions 24f (for example, six concave portions 24f at an interval of approximately) 60° that can be engaged with the convex portions 29a may be formed on an end surface 24a of the handle arm 24 on the partitioning wall 27A side. The concave portions 24f can be engaged with the plurality of convex portions 29a formed on the side surface 27e of the tubular member 27. In this case, it is preferable that the convex portions 29a and the concave portions 24f have a tapered shape (with tapered surfaces being pressure-engaged with each other in the axial direction) in the axial direction at an engagement part, and the engagement relationship can facilitate the engagement during the tightening operation and can suppress the backlash in the axial direction.

In addition, in the above-described configuration, the handle arm 24 and the handle shaft 22 may be ultimately disengaged from the tubular member 27 when the connection shaft 25 continues to be loosened. As such, it is preferable that a retaining member (retaining pin) 22p be mounted in the vicinity of an end point of the central shaft hole 22c of the handle shaft 22 as in FIG. 3. A groove 27p that may extend in the axial direction may be formed on the inner circumferential surface 27c of the tubular member 27 such that the retaining member 22p may be inserted, and the handle shaft 22 may be configured to be retained by caulking a handle arm 24 side end portion.

Next, an operation and an effect of the assembly structure of the assembly part of the handle configured as described above will be described.

Both of the end portions 7b of the driving shaft cylinder 7 may project with respect to the reel main body 2, and the right and left handles can be replaced with each other by using the projecting end portions 7b. In a case where the right-side handle is used as illustrated in FIGS. 2 and 3, the inner circumferential surface 27b of the tubular member 27 may be fitted into the right-side end portion 7b of the driving shaft cylinder 7 projecting from the reel main body 2 not to be rotated and the handle shaft 22 may be fitted into the inner circumferential surface 27c of the tubular member 27 not to be rotated. In this state, the connection shaft 25 may be inserted from the opposite end portion side (left-side end portion 7b side) of the driving shaft cylinder 7, and the connection shaft 25 and the handle shaft 22 may be screwed with each other while the rotation operation may be performed on the cap 25a.

When the connection shaft 25 is tightened, the handle shaft 22 may be gradually moved to the drive gear 7 side and the tubular member 27 may also be moved to the drive gear 7 side in response, and the driving shaft cylinder 7 and the tubular member 27 may be engaged with each other without backlash as the convex portions 7d formed on the open end surface 7c of the driving shaft cylinder 7 are engaged with the concave portions 28a formed on the side surface 27d of the partitioning wall 27A which may be the first engagement portion. In addition, when the handle shaft 22 is gradually moved to the drive gear 7 side, the handle arm 24 that may be in a state of being capable of oscillating (state of being capable of being folded) about the supporting shaft 22a with respect to the handle shaft 22 as illustrated with the dotted line in FIG. 2 may stand as illustrated with the solid line and ultimately the tubular member 27 and the handle arm 24 may be engaged with each other without backlash as the concave portions 24f formed on the end surface 24a of the handle arm 24 are engaged with the convex portions 29a formed on the end surface 27e on the handle arm 24 side which may be the second engagement portion. In other words, in a state where the handle is used, the driving shaft cylinder 7 and the handle arm 24 (handle shaft 22) may be connected without backlash via the first engagement portion 28 and the second engagement portion 29 of the tubular member 27 described above. In particular, backlash in the direction of rotation can be effectively suppressed by using the relationship in which the tapered surfaces of both of the engagement portions having a tapered shape in the axial direction may be engaged with each other.

In addition, a driving force from the rotation operation of the handle arm 24 may be configured to be transmitted to the driving shaft cylinder 7 side via the connection between the handle shaft 22 and the tubular member 27 (detent fitting for both) in a state of being divided in the axial direction from the driving shaft cylinder 7 and the connection between the driving shaft cylinder 7 and the tubular member 27 (detent fitting for both) in a state of being divided in the axial direction from the handle shaft 22, and thus a transmission system for the driving force from a handle side may not be in a state of integration along with the tubular member 27. Accordingly, the first engagement portion 28 and the second engagement portion 29 of the tubular member 27 may not have to maintain accuracy within a constant range of play (gap•cross) and the play may be allowed independently in each of the engagement portions. As such, there may be room for dimension control, and an assembly operation and a folding operation of a handle part may be facilitated. In addition, a load in the direction of rotation may be unlikely to be imposed to the first engagement portion 28 and the second engagement portion 29 of the tubular member 27, and thus the backlash in the axial direction can be effectively suppressed. Furthermore, as described above in this embodiment, the partitioning wall 27A and the handle shaft 22 may have a relationship in which the gap G may be generated therebetween even when the connection shaft 25 is tightened, and thus there can be some flexibility in dimensional accuracy of the handle shaft 22 in the axial direction.

In addition, in the configuration of this embodiment, the partitioning wall 27A may be formed in the hollow portion of the tubular member 27 and the driving shaft cylinder 7 and the handle shaft 22 may be partitioned without being directly engaged (directly fitted) with the partitioning wall 27A being a boundary. Accordingly, the handle shaft 22 formed to be long may not necessarily have to be directly fitted into the driving shaft cylinder 7, and thus backlash of both can be reliably prevented while a reduction in strength which may be caused by a reduction in diameter can be prevented because the handle shaft 22 may not necessarily have to be reduced in diameter. Furthermore, according to this embodiment, the ease of assembly of the tubular member 27 may be improved since the driving shaft cylinder 7 and the handle shaft 22 may be inwardly fitted into the tubular member 27 from both sides with the partitioning wall 27A being a boundary, the first engagement portion 28 may be formed on the side surface 27d of the partitioning wall 27A, and the second engagement portion 29 may be formed on the end surface 27e of the tubular member 27.

The above-described embodiment can be embodied through modifications as follows, for example.

The partitioning wall 27A may not be formed in the tubular member 27. In this case, the first engagement portion 28 can be formed on the end surface of the tubular member 27 on the drive gear 7A side. In addition, the handle shaft 22 and/or the driving shaft cylinder 7 may have a structure of outward fitting with respect to the tubular member 27.

Next, a fishing spinning reel 101 of a second embodiment of the present invention will be described with reference to FIGS. 9 to 12.

Figure 9:
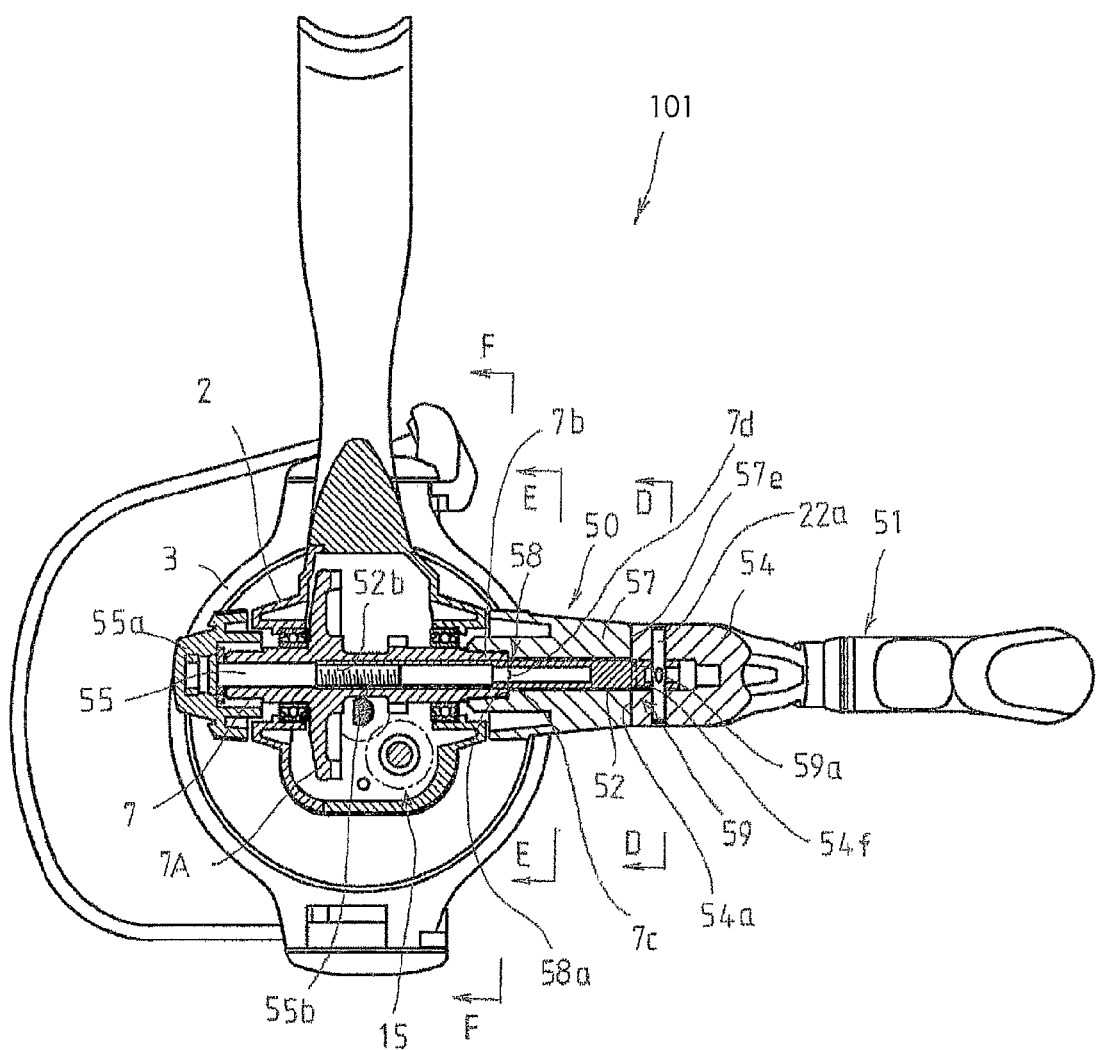
FIG. 9 is a partial sectional view illustrating a second embodiment of the fishing spinning reel according to the present invention viewed from a rear.
Figure 10:
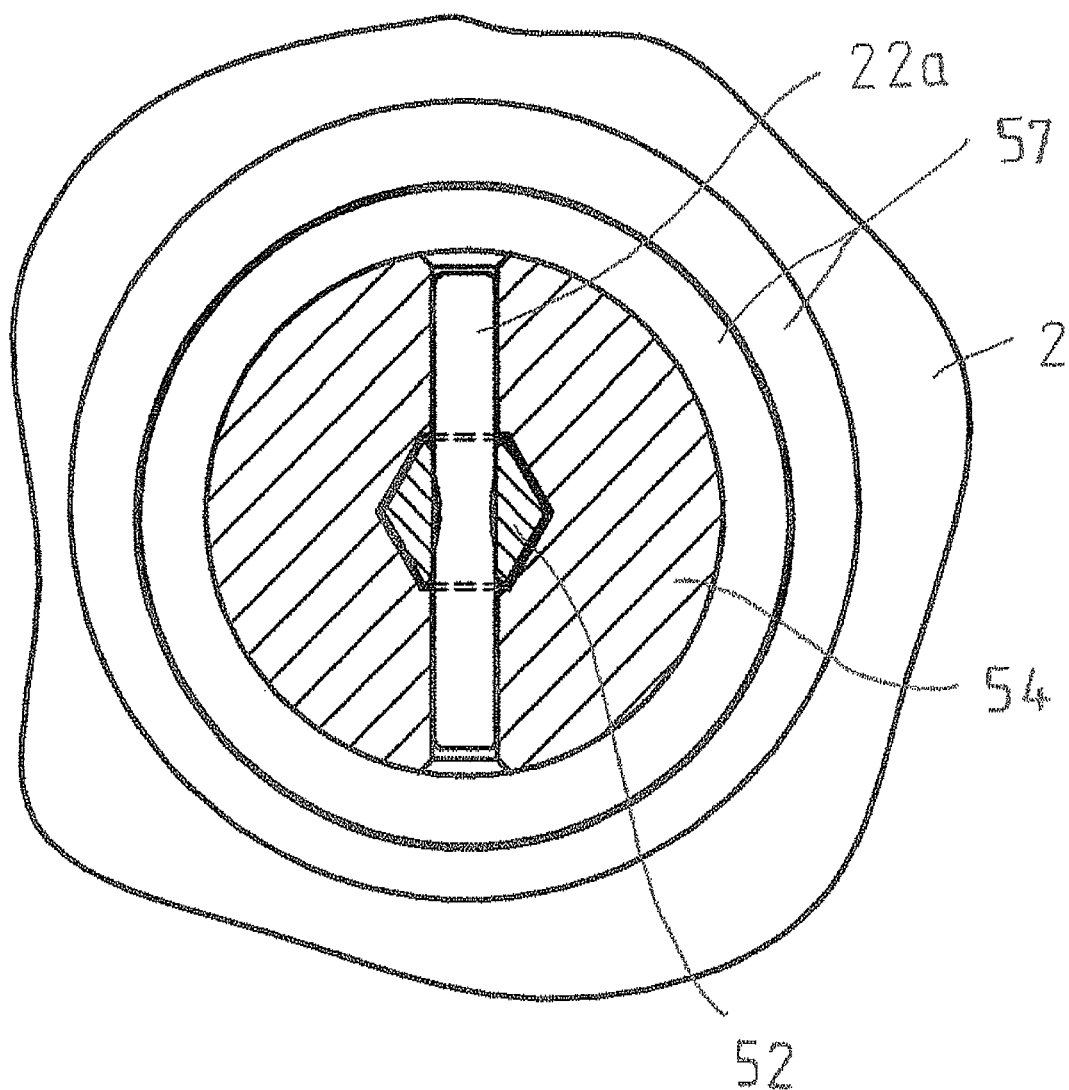
FIG. 10 is a sectional view taken along line D-D of FIG. 9.
Figure 11:
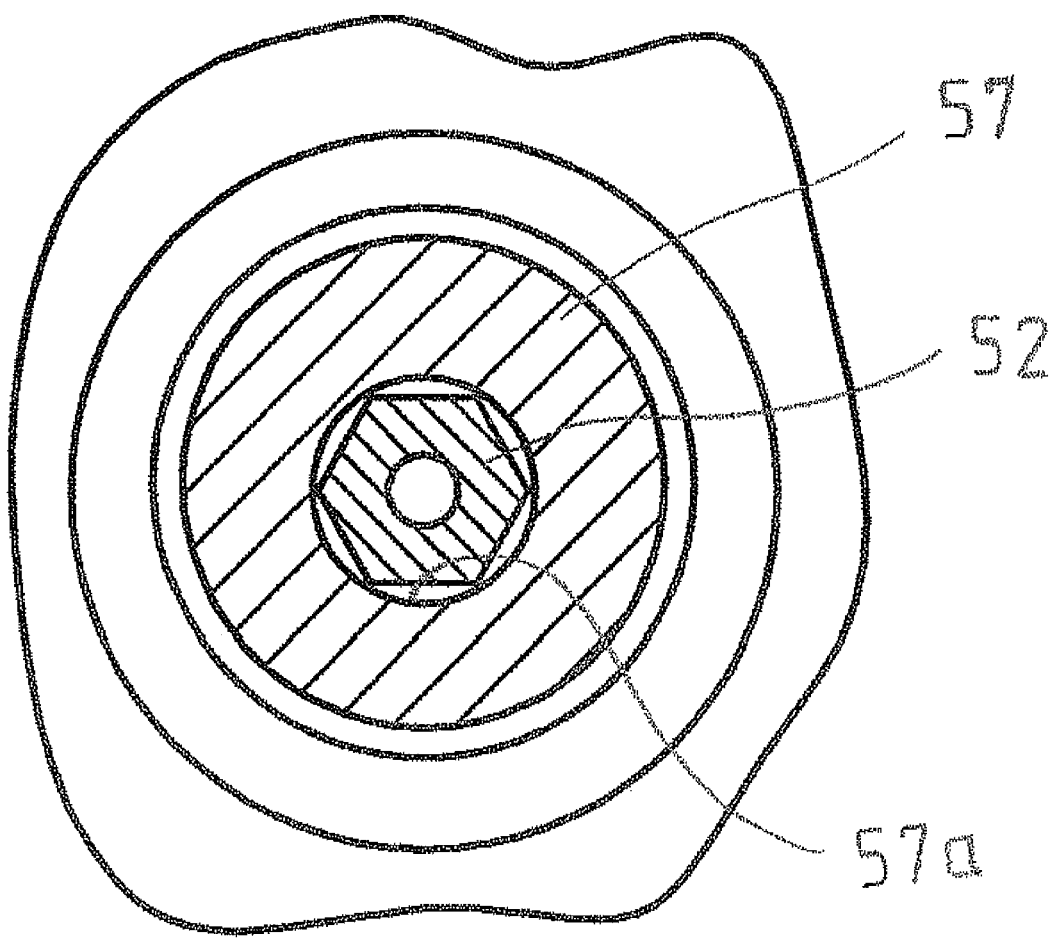
FIG. 11 is a sectional view taken along line E-E of FIG. 9.
Figure 12:
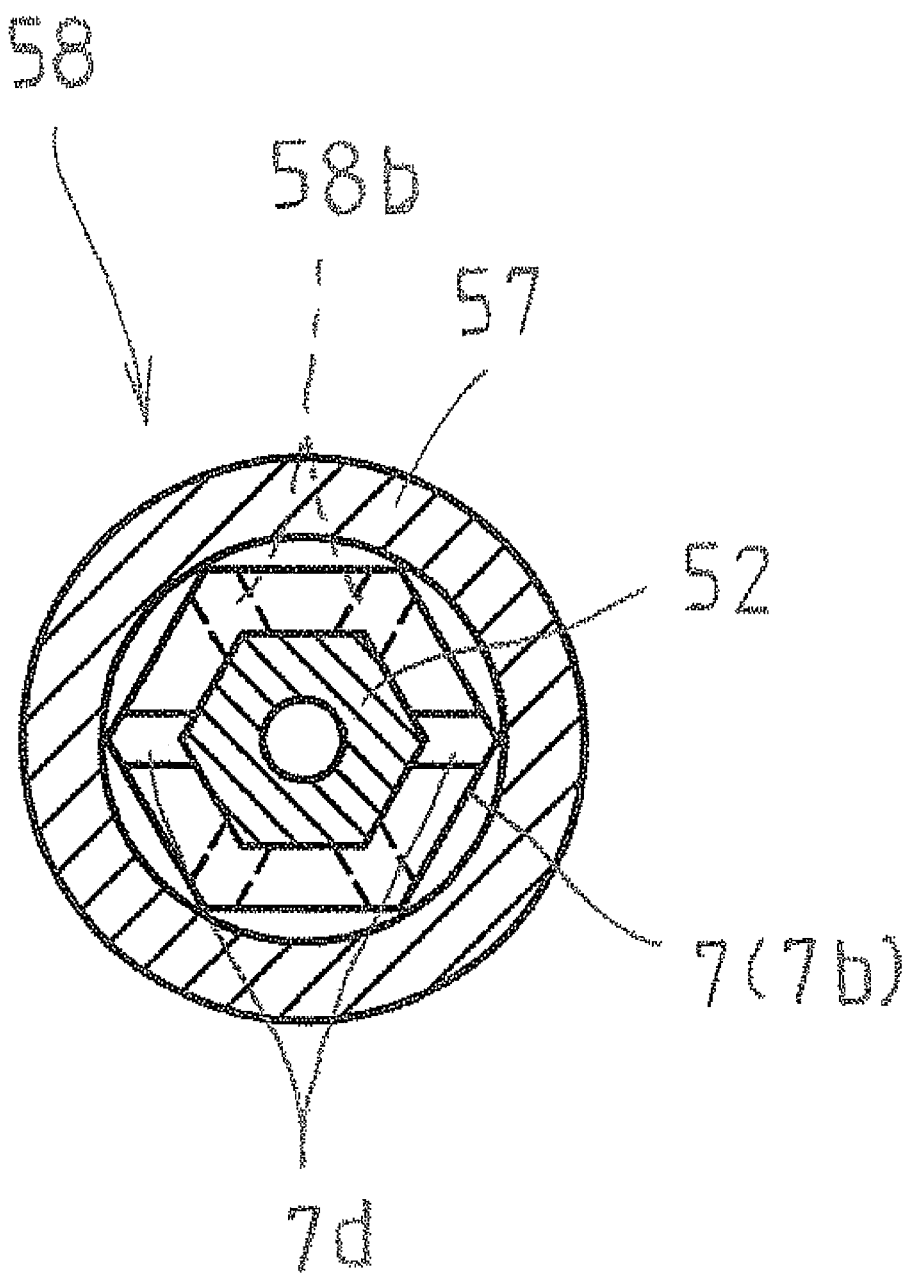
FIG. 12 is a sectional view taken along line F-F of FIG. 9.

Of the drawings, FIG. 9 is a partial sectional view of the fishing spinning reel 101 viewed from a rear, FIG. 10 is a sectional view taken along line D-D of FIG. 9, FIG. 11 is a sectional view taken along line E-E of FIG. 9, and FIG. 12 is a sectional view taken along line F-F of FIG. 9. In addition, the fishing reel 101 according to the second embodiment has the same configuration as the fishing spinning reel 1 of the first embodiment described above excluding the structure of the assembly part of the handle. Accordingly, the same reference numerals are attached to the same configuration as in the fishing spinning reel 1 of the first embodiment and detailed description thereof will be omitted.

In an assembly structure 50 of the assembly part of the handle of the fishing spinning reel 101 of this embodiment, a handle shaft 52 of a handle 51 having a handle arm 54 that may be axially supported in a pivotable manner may be inserted into a tubular member 57 in a rotatable manner as illustrated in FIG. 11. In other words, a through-hole of the tubular member 57 may have an inner circumferential surface 57a having a circular cross-sectional shape, and the handle shaft 52 which may be formed to have a polygonal cross-sectional shape may be inserted thereinto such that both have a rotatable relationship. In addition, the tubular member 57 may be configured and arranged to cover an outer surface within a constant range in the axial direction from an end portion of the driving shaft cylinder 7 on a handle shaft 52 side. The handle shaft 52 that may have the polygonal cross-sectional shape may extend into the driving shaft cylinder 7, specifically to a position of the drive gear 7A, and may be inwardly fitted into an inner surface of the driving shaft cylinder 7 in an integrally rotatable manner as illustrated in FIG. 12. In this manner, a driving force from the handle arm 54 may be transmitted to the driving shaft cylinder 7 from the handle shaft 52 which may be inwardly fitted in an integrally rotatable manner.

In addition, a connection shaft 55 may be inserted into the driving shaft cylinder 7 to be capable of relatively rotating with respect to the driving shaft cylinder 7, and a male threaded portion 55b that may be formed at a tip of the connection shaft 55 may be screwed with a female threaded portion 52b that may be formed at a tip of the handle shaft 52. In other words, the handle shaft 52 may be moved in the axial direction and the handle 51 can be fixed to a state of use through a rotation operation of a cap (rotating knob) 55a and by using a screwing relationship of both (right-handed use is set in FIG. 9).

As in the above-described first embodiment, a first engagement portion 58 that may be engaged with the driving shaft cylinder 7 in a state where the handle is used and a second engagement portion 59 that may be engaged with the handle arm 54 in a state where the handle is used may be formed in the tubular member 57.

The first engagement portion 58 according to this embodiment may be formed on a side surface 58a that may be in contact with an end portion of the driving shaft cylinder 7 on the handle shaft 52 side, and may be configured to have a plurality of concave portions 58a (for example, six concave portions 58a formed at an interval of approximately 60°) which may extend in the radial direction from an opening 57a and may be formed at regular intervals in the circumferential direction as illustrated in FIG. 12. In addition, the plurality of convex portions 7d (for example, two convex portions 7d at an interval of approximately 180°) that can be engaged with the concave portions 58b may be formed on the open end surface 7c of the driving shaft cylinder 7 in the end portion of the handle shaft 52 side. The convex portions 7d can be engaged with the concave portions 58b formed on the side surface 58a when the driving shaft cylinder 7 is inserted into the tubular member 57. In this case, it is preferable that the concave portions 58b and the convex portions 7d have a tapered shape (have an engagement relationship between tapered surfaces) in the axial direction at an engagement part, and the engagement relationship can facilitate the engagement during a tightening operation and can suppress backlash in the axial direction.

In addition, as in the above-described first embodiment, the second engagement portion 59 according to this embodiment may be formed on an end surface 57e of the tubular member 57 on a handle arm 54 side, and may be configured to have a plurality of convex portions 59a (for example, two convex portions 59a formed at an interval of approximately 180°) which may extend in the radial direction from the opening 57a and may be formed at regular intervals in the circumferential direction. In addition, a plurality of concave portions 54f (for example, six concave portions 54f at an interval of approximately 60°) that can be engaged with the convex portions 59a may be formed on an end surface 54a of the handle arm 54 on a tubular member 57 side. The concave portions 54f can be engaged with the plurality of convex portions 59a formed on the end surface 57e of the tubular member 57. In this case, it is preferable that the convex portions 59a and the concave portions 54f have a tapered shape (with tapered surfaces being pressure-engaged with each other in the axial direction) in the axial direction at an engagement part, and the engagement relationship can facilitate the engagement during the tightening operation and can suppress the backlash in the axial direction.

In the fishing spinning reel 101 according to the second embodiment, the first engagement portion 58 and the second engagement portion 59 may be disposed in the tubular member 57 as in the first embodiment, and these engagement portions may be engaged with the driving shaft cylinder 7 and the handle arm 54 in a state where the handle is used such that the backlash from the handle arm 54 to a driving shaft cylinder 7 part can be suppressed. In addition, the handle shaft 52 may be inserted in a rotatable manner into the tubular member 57 to be inwardly fitted to be capable of integrally rotating with respect to the driving shaft cylinder 7, and a driving force from the handle arm 54 may be transmitted from the handle shaft 52 to the driving shaft cylinder 7 such that the driving force of the handle shaft 52 may not be transmitted to the tubular member 57. In other words, a transmission system for the driving force from the handle may not be in a state of integration along with the tubular member 57. Accordingly, the first engagement portion 58 and the second engagement portion 59 of the tubular member 57 may not have to maintain accuracy within a constant range of play (gap•cross) and the play may be allowed independently in each of the engagement portions. As such, there may be room for dimension control, and an assembly operation and a folding operation of a handle part may be facilitated. In addition, a load in the direction of rotation may be unlikely to be imposed to the first engagement portion 58 and the second engagement portion 59 of the tubular member 57, and thus the backlash in the axial direction can be effectively suppressed.

Furthermore, in this embodiment, the driving shaft cylinder 7 may be inwardly fitted into the tubular member 57 in a rotatable manner and the first engagement portion 58 may be formed on the side surface 58a which may be in contact with the end portion of the inwardly fitted driving shaft cylinder 7, and thus the ease of assembly of the tubular member 57 may be improved.

The above-described second embodiment can be embodied through modifications as follows, for example. The driving shaft cylinder 7 may have a structure of outward fitting with respect to the tubular member 57. In addition, for example, the structures of the engagement portions formed by the tubular members of the respective embodiments may not be limited to the engagement methods described above, but various modifications can be made thereto.

Figure 13:
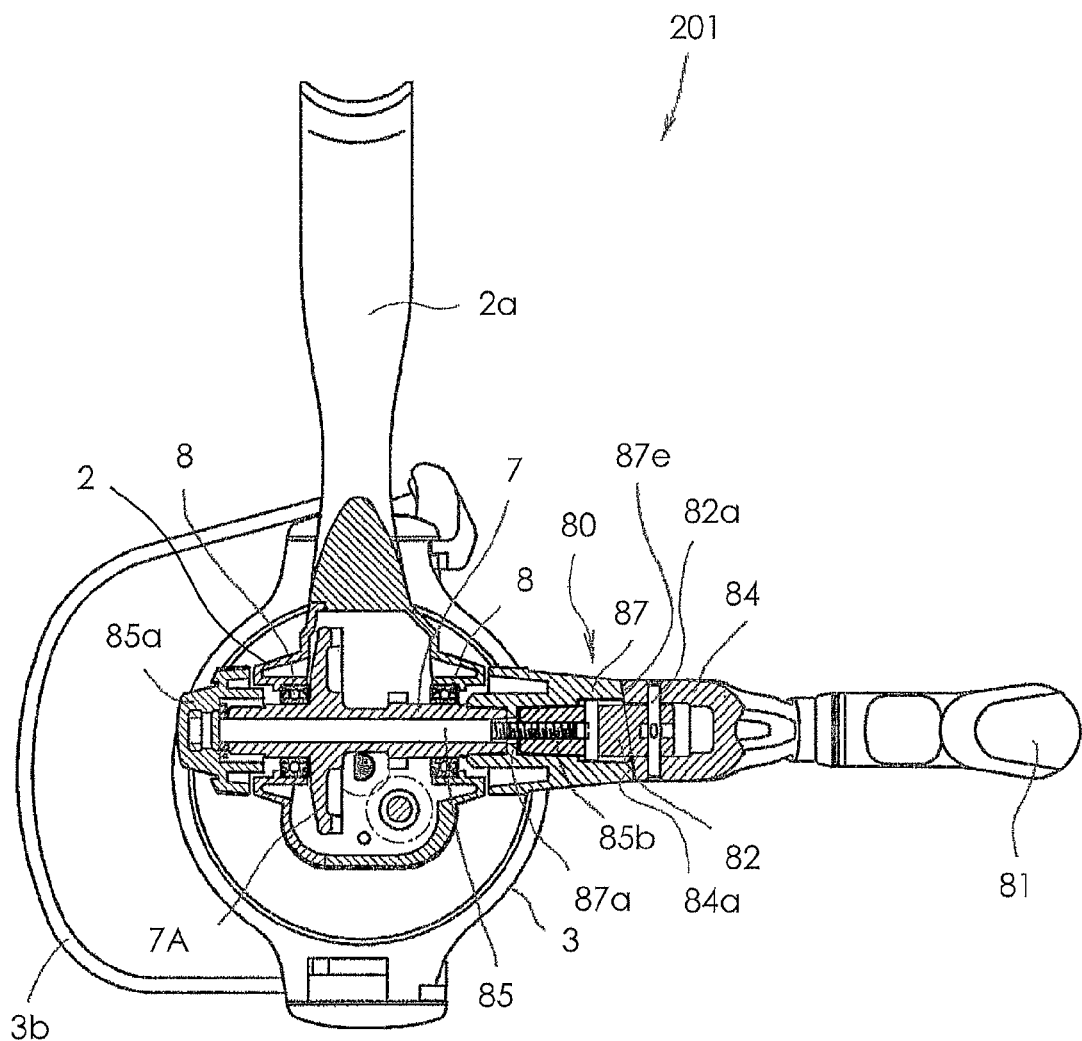
FIG. 13 is a partial sectional view illustrating a third embodiment of the fishing spinning reel according to the present invention viewed from a rear.
Figure 14:
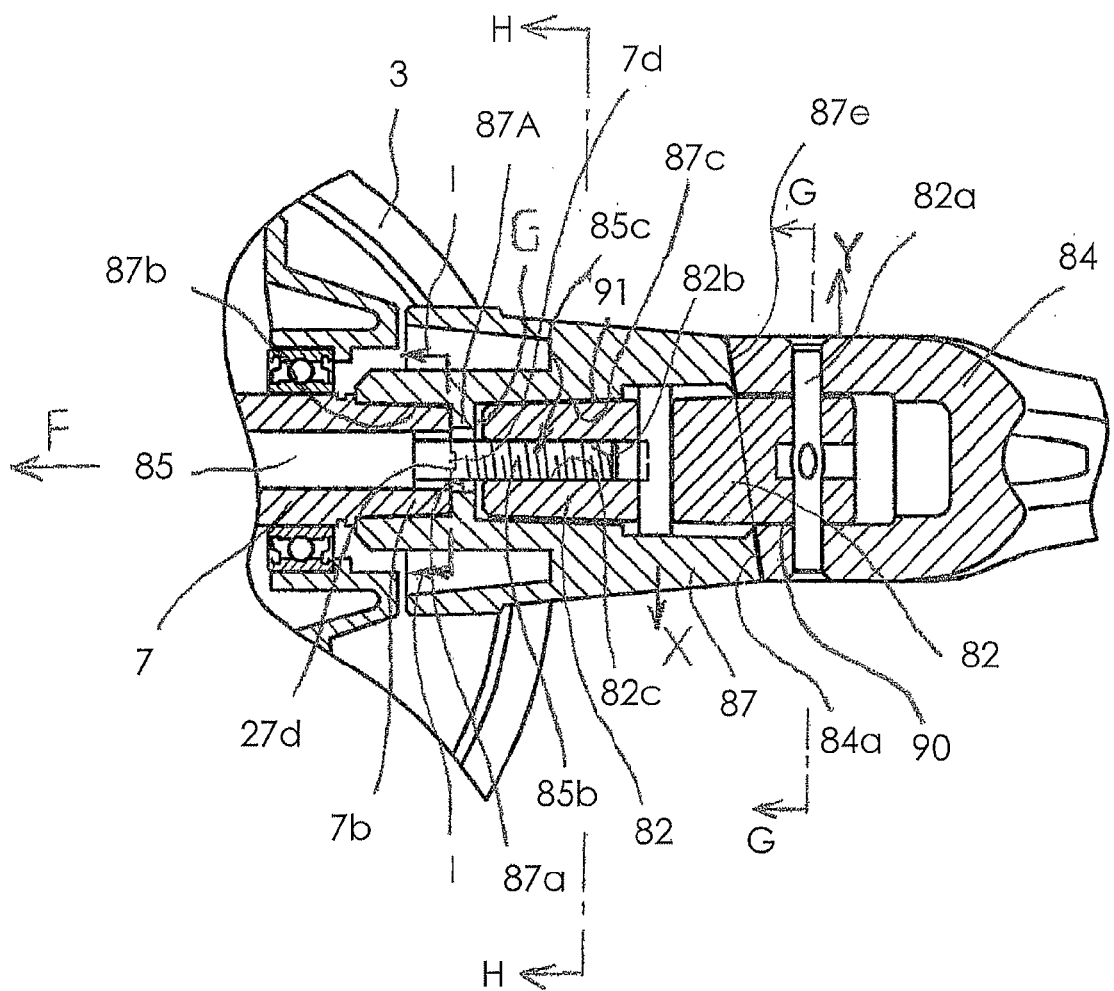
FIG. 14 is a partial sectional view of a main part of an assembly part of a handle.
Figure 15:
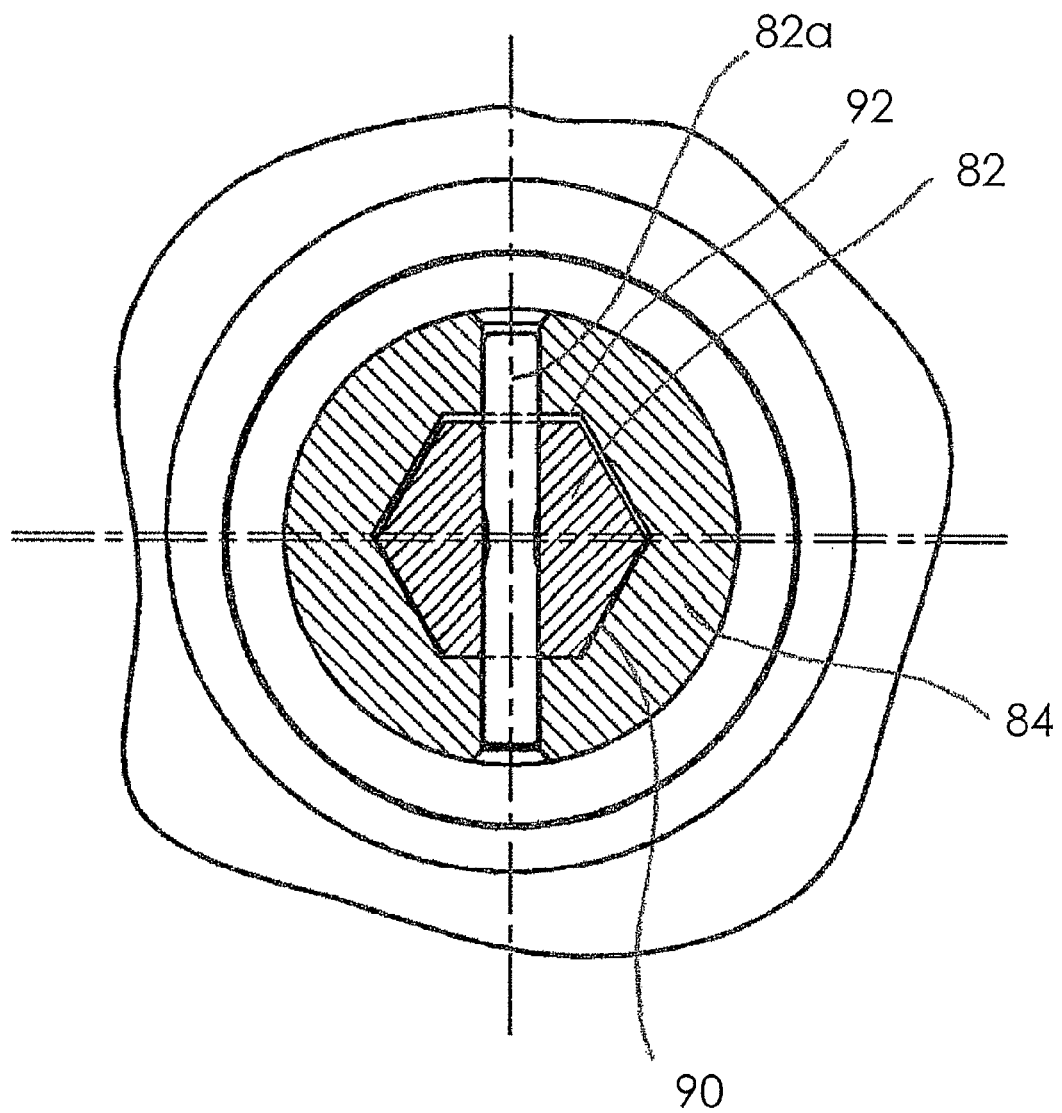
FIG. 15 is a sectional view taken along line G-G of FIG. 14.
Figure 16:
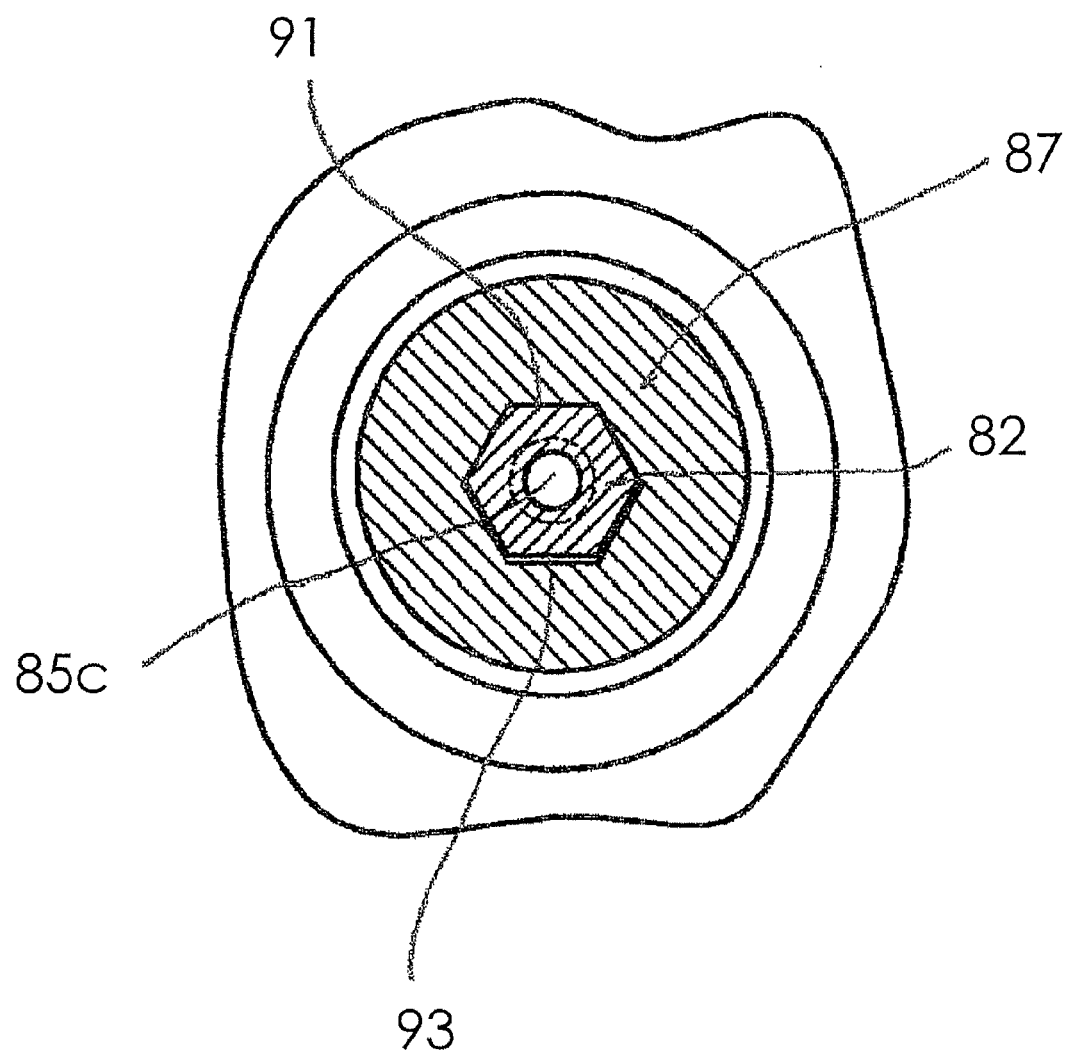
FIG. 16 is a sectional view taken along line H-H of FIG. 14.
Figure 17:
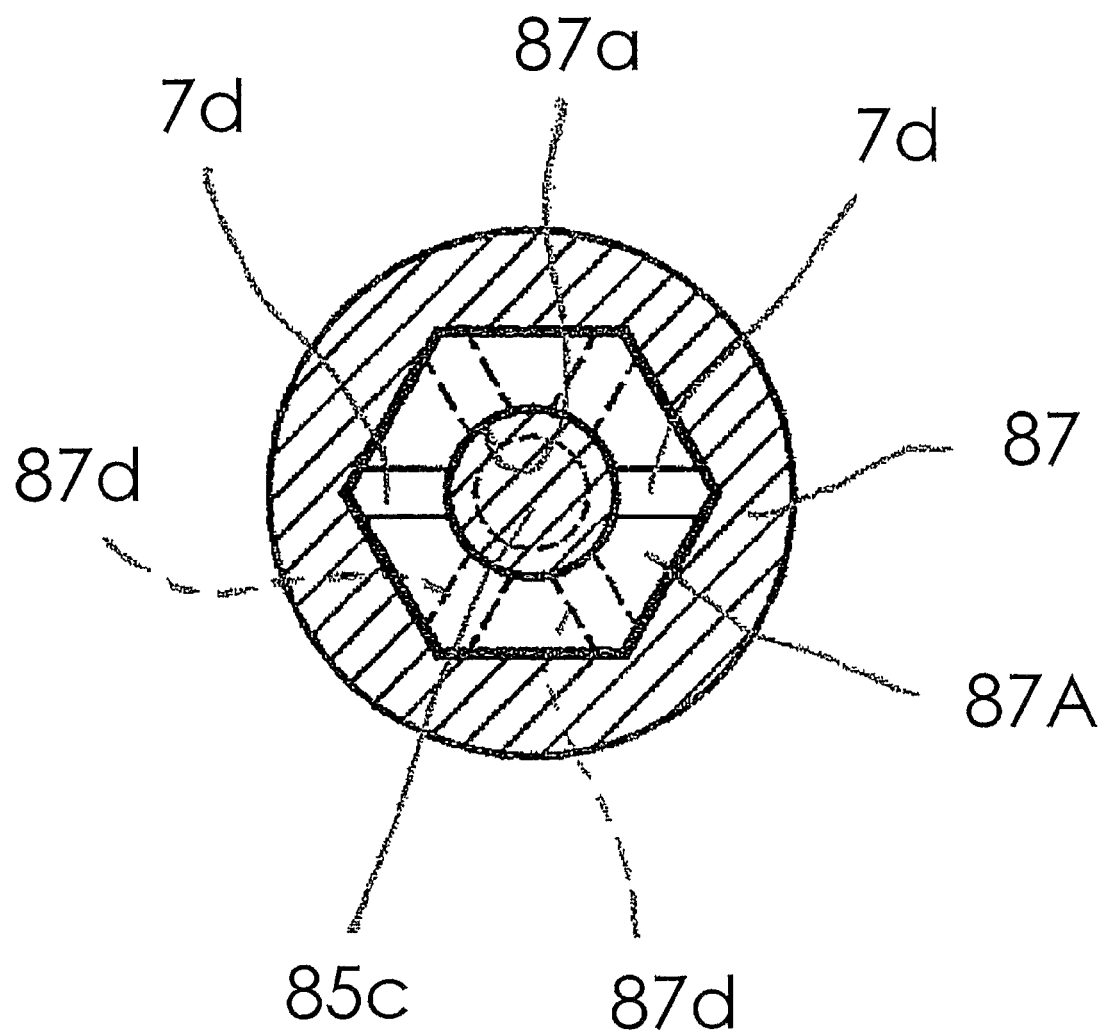
FIG. 17 is a sectional view taken along line I-I of FIG. 14.
Figure 18:
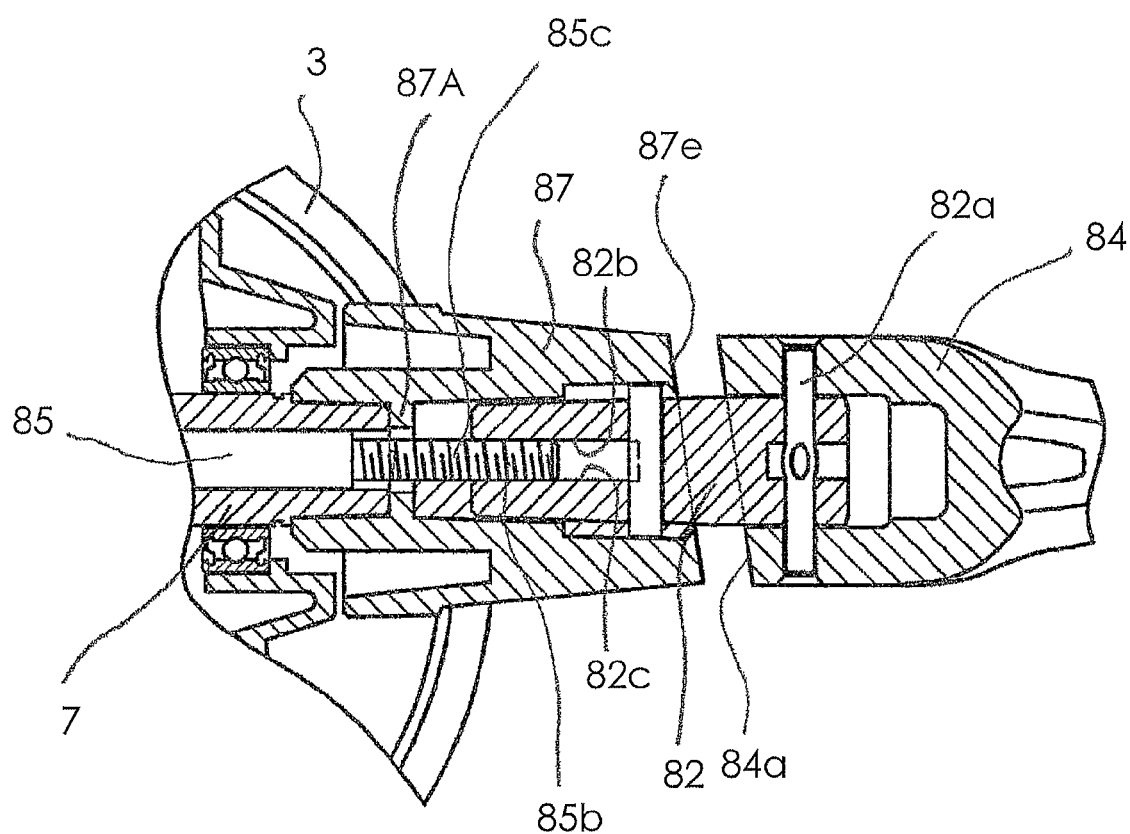
FIG. 18 is a partial sectional view illustrating a state where the main part of the assembly part of the handle is disassembled.

Next, a fishing spinning reel 201 according to a third embodiment of the present invention will be described with reference to FIGS. 13 to 18. Of the drawings, FIG. 13 is a partial sectional view of the fishing spinning reel 201 viewed from a rear, FIG. 14 is a partial sectional view of a main part of an assembly part of a handle, FIG. 15 is a sectional view taken along line G-G of FIG. 14, FIG. 16 is a sectional view taken along line H-H of FIG. 14, FIG. 17 is a sectional view taken along line I-I of FIG. 14, and FIG. 18 is a partial sectional view illustrating a state where the main part of the assembly part of the handle is disassembled. In addition, the fishing reel 201 according to the third embodiment has the same configuration as the fishing spinning reel 1 of the first embodiment described above excluding the structure of the assembly part of the handle. Accordingly, the same reference numerals are attached to the same configuration as in the fishing spinning reel 1 of the first embodiment and detailed description thereof will be omitted.

As is apparent in FIGS. 13 and 14, an assembly structure 80 of the assembly part of the handle that may be assembled with the driving shaft cylinder 7 may have a handle shaft 82 which may be arranged in a coaxially and integrally rotatable manner along the axial direction on one end of the driving shaft cylinder 7, a handle arm 84 whose base end portion may be mounted on and fixed to one end portion of the handle shaft 82 in a pivotable manner via a supporting shaft (pivotal support pin) 82a with a handle 81 being mounted on a tip portion thereof, a tubular member 87 which may be interposed between the driving shaft cylinder 7 and the handle arm 84 and may be arranged over an area excluding a handle shaft 82 side end portion of the driving shaft cylinder 7 and a handle arm 84 side end portion of the handle shaft 82 to surround these, and a connection shaft 85 with a circular cross-sectional shape which may be inserted from the other side of the driving shaft cylinder 7 into a hollow portion thereof and may be screwed with, inserted into, and tightened in a central shaft hole 82c (refer to FIG. 14) formed in the other end portion of the handle shaft 82.

A cap (rotating knob) 85a that may be exposed from the reel main body 2 may be disposed in the end portion of the connection shaft 85, a male threaded portion 85b that may be formed on an outer circumferential surface of a tip 85c (refer to FIG. 14) of the connection shaft 85 may be screwed with a female threaded portion 82b (refer to FIG. 14) that may be formed on an inner circumferential surface of the central shaft hole 82c (refer to FIG. 14) of the handle shaft 82. The connection shaft 85 and the driving shaft cylinder 7 may have relationship in which the connection shaft 85 and the driving shaft cylinder 7 can be moved and can be relatively rotated in the axial direction.

A partitioning wall 87A may be formed at a position of an inner circumferential surface of the tubular member 87 moved to the drive gear 7A side from the middle of the axial direction thereof, and an opening 87a may be formed at an approximately center of the partitioning wall 87A such that a tip of the connection shaft 85 with the circular cross-sectional shape may be inserted into the opening 87a. In addition, the driving shaft cylinder 7 and the handle shaft 82 may be partitioned by the partitioning wall 87A. The partitioning wall 87A and the handle shaft 82 may have a relationship in which the gap G (refer to FIG. 14) may be generated therebetween even when the connection shaft 85 is tightened.

In the tubular member 87, both an inner circumferential surface 87b (refer to FIG. 14) on the drive gear 7A side from the partitioning wall 87A and an inner circumferential surface 87c (refer to FIG. 14) on the handle arm 84 side from the partitioning wall 87A have a polygonal cross-sectional shape, and the end portion 7b (refer to FIG. 14) of the driving shaft cylinder 7 that may be formed to have a polygonal cross-sectional shape and the handle shaft 82 that may be formed to have a polygonal cross-sectional shape may be respectively fitted into these parts not to be rotated.

In addition, in this embodiment, cam surfaces as supporting surfaces having a tapered shape are formed (refer to FIG. 18) at respective interface sites of the tubular member 87 and the handle arm 84 that may be in surface contact with each other by an axial-direction tightening force (force with which the handle shaft 82 may be drawn toward the driving shaft cylinder 7 side as illustrated with an arrow F in FIG. 14) caused by the screwing between the handle shaft 82 and the connection shaft 85, that is, a handle arm side end surface 87e of the tubular member 87 and a driving shaft cylinder side end surface 84a of the handle arm 84. The cam surfaces 84a and 87e may be inclined in the direction of rotation of the handle, and backlash generated in the components of the assembly structure 80 can be removed by cam operations thereof.

Specifically, when the handle shaft 82 and the connection shaft 85 are screwed with each other, a part of the driving shaft cylinder side end surface 84a of the handle arm 84 connected to the handle shaft 82 in a pivotable manner, that is, the cam surface 84a may abut against the handle arm side end surface 87e of the tubular member 87, that is, the cam surface 87e, and the handle arm 84 may oscillate about the supporting shaft 82a with the abutting part being a fulcrum to be drawn to a tubular member 87 side. In this manner, the cam surfaces 84a and 87e may be in full contact with each other. When the connection shaft 85 is further screwed with the handle shaft 82, the handle arm 84 and the tubular member 87 may begin to be relatively displaced along the cam surfaces 84a and 87e in contact with each other due to the axial-direction tightening force F. This is for a clearance to be present between the handle shaft 82 and the handle arm 84 and the tubular member 87 such that these may be assembled, and the handle arm 84 and the tubular member 87 may be relatively displaced as much as this clearance. In other words, as illustrated in arrows X and Y in FIG. 14, the handle arm 84 and the tubular member 87 may be displaced in the opposite directions along the cam surfaces 84a and 87e. In this manner, the handle arm 84 may be attached to (pressed against) the handle shaft 82 from a side of an abutting portion 90 (refer to FIGS. 14 and 15) while the tubular member 87 may be attached to (pressed against) the handle shaft 82 from a side of an abutting portion 91 (refer to FIGS. 14 and 16). In addition, the pressing states in the abutting portions 90 and 91 may be maintained by the axial-direction tightening force F. In other words, in this state, the handle arm 84 and the tubular member 87 and the handle shaft 82 may be pressed against and fixed to each other, and the backlash of these components may be prevented. In addition, since the cam surfaces 84a and 87e may be inclined in the direction of rotation of the handle, the backlash in the direction of rotation during the rotation of the handle can be prevented as well. It is a matter of course that gaps 92 and 93 may be generated on the side opposite to the abutting portions 90 and 91 in a state where the backlash is prevented.

In addition, in this embodiment, fitting dimensions of the components may be set such that an outer surface of the handle arm 84 and an outer surface of the tubular member 87 may be flush in a state where the handle arm 84 and the tubular member 87 and the handle shaft 82 may be pressed against and fixed to each other in the abutting portions 90 and 91. This can be achieved by, for example, estimating a displacement amount at which the handle arm 84 and the tubular member 87 may be displaced in the opposite direction along the cam surfaces 84a and 87e and by, for example, shifting grooving of the handle arm 84 from a central axis (shifting a central axis of an insertion hole of the handle arm 84 into which the handle shaft 82 may be inserted from a central axis of the handle arm 84).

As described above, according to this embodiment, the tubular member 87 and the handle arm 84 may have the respective cam surfaces 84a and 87e with a tapered shape at the interface sites where these may be in surface contact with each other by the axial-direction tightening force F caused by the screwing between the handle shaft 82 and the connection shaft 85 and the handle arm 84 and the tubular member 87 may be relatively displaced along the cam surfaces 84a and 87e in contact with each other by the axial-direction tightening force F such that the handle arm 84 and the tubular member 87 and the handle shaft 82 may be pressed against and fixed to each other, and thus the backlash between the handle arm 84 and the tubular member 87 and the handle shaft 82 may be automatically and reliably removed by using the existing components of the assembly structure 80 (without having to provide an additional component) and just by assembling the components of the assembly structure 80. In other words, the minimum clearance required for the assembly can be ensured during the assembly of the components of the assembly structure 80 and the clearance can be removed to prevent the backlash when the assembly is completed.

Figure 19:
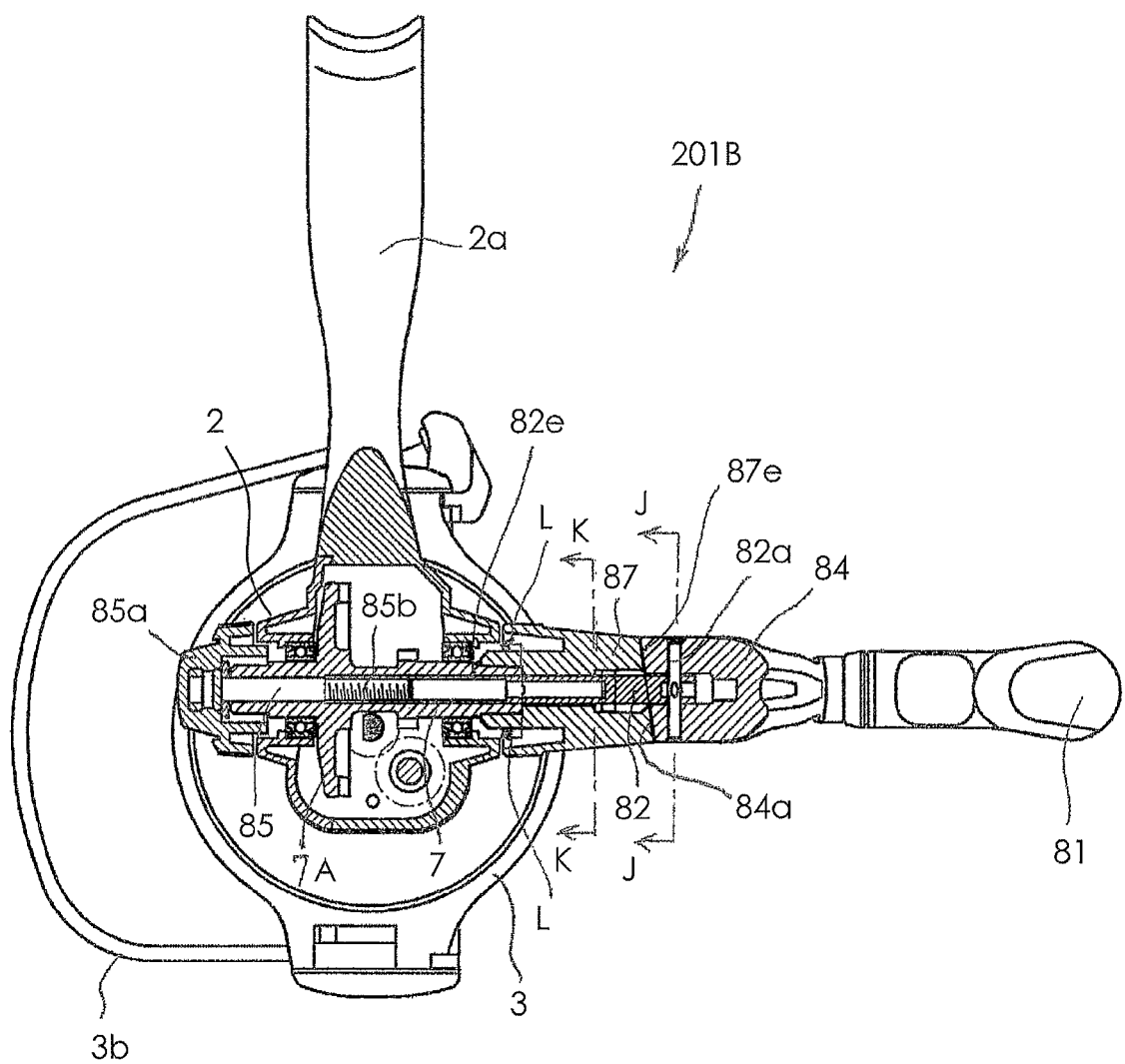
FIG. 19 is a partial sectional view illustrating a fishing spinning reel of a modification example of the third embodiment viewed from a rear.
Figure 20:
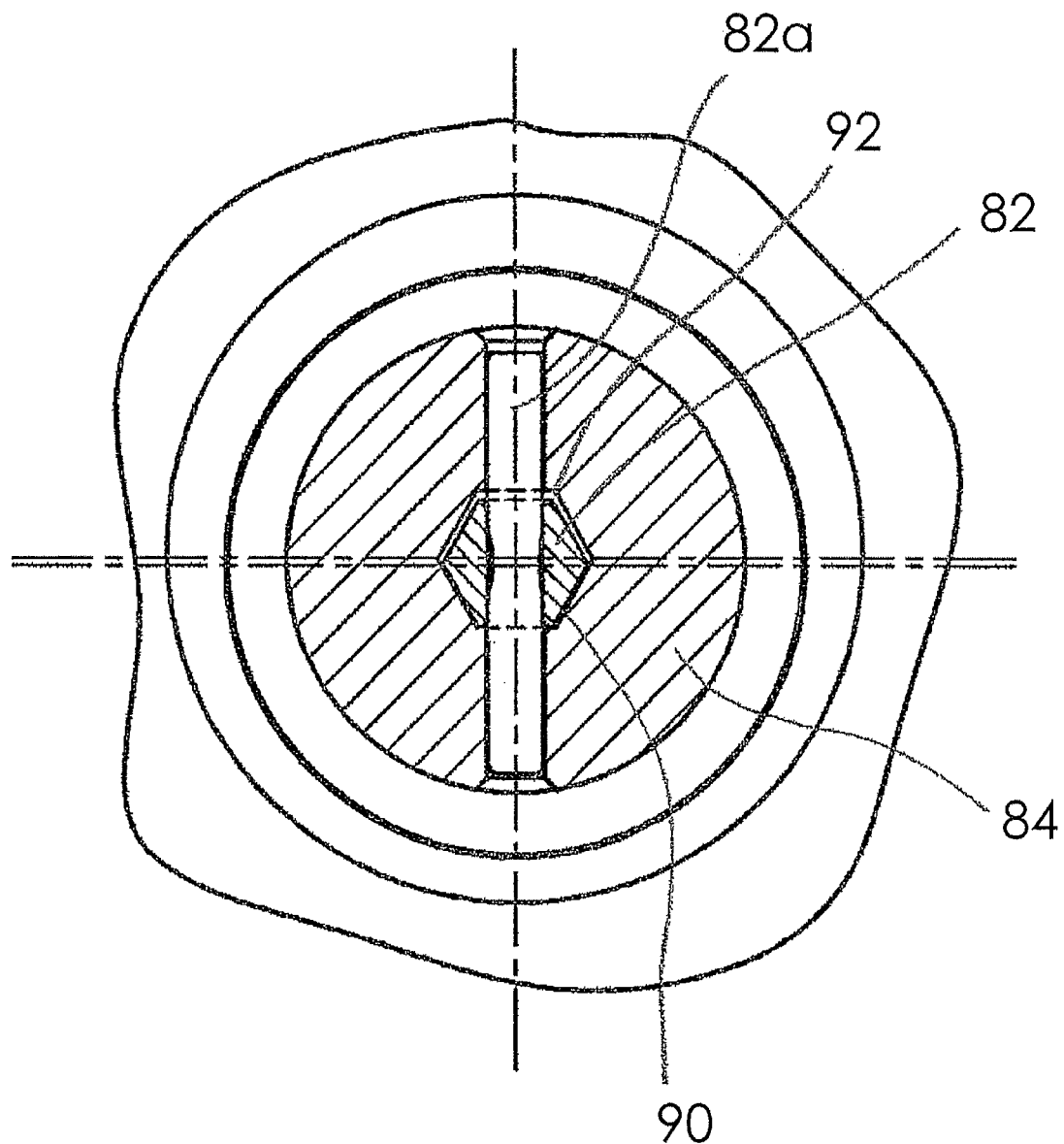
FIG. 20 is a sectional view taken along line J-J of FIG. 19.
Figure 21:
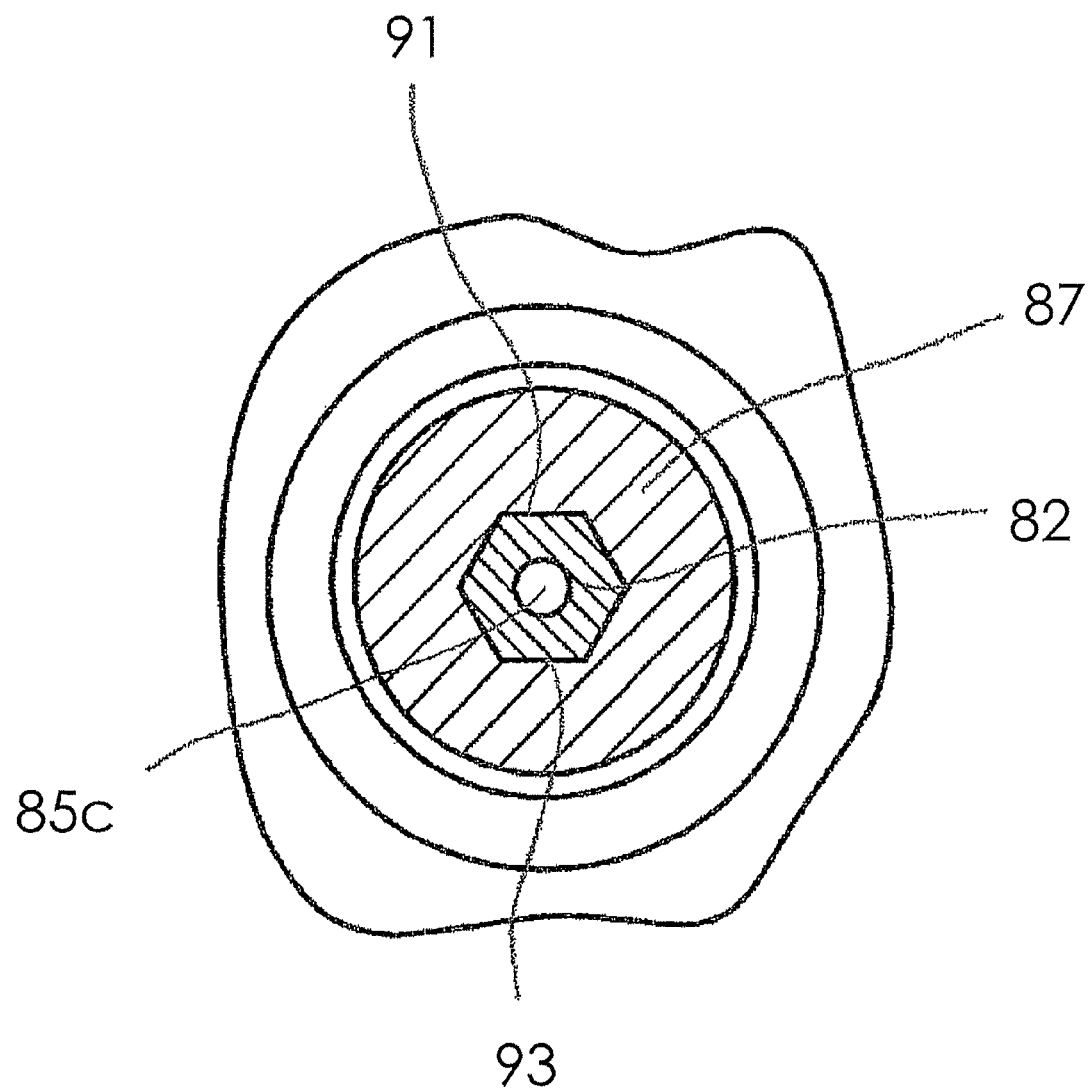
FIG. 21 is a sectional view taken along line K-K of FIG. 19.
Figure 22:
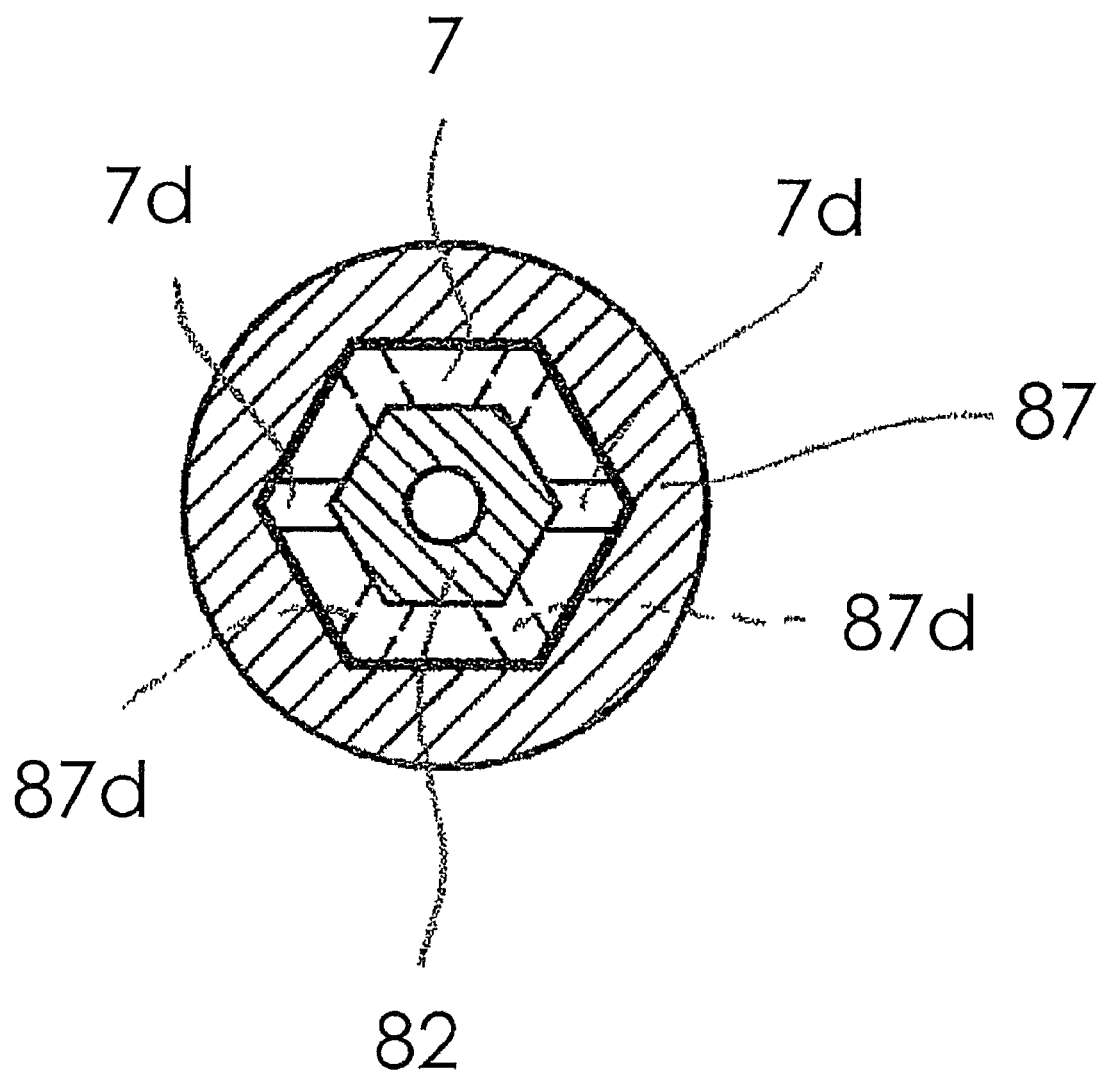
FIG. 22 is a sectional view taken along line L-L of FIG. 19.

FIG. 19 is a partial sectional view of a fishing spinning reel 201B according to a modification example of the third embodiment viewed from a rear. FIG. 20 is a sectional view taken along line J-J of FIG. 19. FIG. 21 is a sectional view taken along line K-K of FIG. 19. FIG. 22 is a sectional view taken along line L-L of FIG. 19. In this modification example, the handle shaft 82 can transmit torque directly to the driving shaft cylinder 7, not via the tubular member 87, unlike in the fishing spinning reel 201 according to the third embodiment. Specifically, a tubular connection portion 82e having a polygonal cross-sectional shape may extend from the handle shaft 82 of this embodiment, and the connection portion 82e may be inserted into the hollow portion of the driving shaft cylinder 7 having a polygonal cross-sectional shape to be screwed with the connection shaft 85 which may be shorter than the fishing spinning reel 201 of the third embodiment. In other words, the handle shaft 82 may be fitted into the driving shaft cylinder 7 not to be rotated (of course, this may not be required but the hollow portion of the driving shaft cylinder 7 and the connection portion 82e of the handle shaft 82 may have a circular cross-sectional shape). The handle arm 84 and the tubular member 87 may be relatively displaced along the cam surfaces 84a and 87e in contact with each other by the axial-direction tightening force F and the handle arm 84 and the tubular member 87 and the handle shaft 82 may be pressed against and fixed to each other in the abutting portions 90 and 91 (refer to FIGS. 20 and 21), which is similar to the fishing spinning reel 201 of the third embodiment. Accordingly, an operation and effect similar to those of the fishing spinning reel 201 of the third embodiment can be achieved with this modification example.

Hereinabove, the third embodiment of the present invention has been described. However, the third embodiment of the present invention may not be limited to the above-described aspect, but various modifications may be possible without departing from the spirit thereof. For example, the inclination direction of the cam surface may not be limited to the direction illustrated in FIG. 14. In other words, the inclination direction of the cam surface may be directed toward the supporting shaft 82a (direction of rotation of the handle) as illustrated in FIG. 14 or, in contrast, may be a direction crossing the supporting shaft 82a (folding direction of the handle) or may be another direction. In addition, in the above-described embodiment, the tubular driving shaft cylinder may be employed as the driving shaft, but the driving shaft with which the assembly structure 80 may be assembled may not necessarily have to form a tubular shape. For example, the entire driving shaft may not necessarily have to form a tubular shape, but the driving shaft may perform power transmission through uneven coupling with the handle arm 84 side. In addition, in the above-described third embodiment, the handle arm 84 may be coupled in a pivotable manner with the handle shaft 82 via the supporting shaft 82a, but the handle arm 84 may not necessarily be coupled via the supporting shaft 82a. Any form of coupling may be possible insofar as the handle arm 84 can oscillate with respect to the handle shaft 82. In addition, in the above-described third embodiment, the cam surfaces forming the cam operation may be employed as the supporting surfaces having a tapered shape which may relatively displace the handle arm 84 and the tubular member 87 by the axial-direction tightening force, but the supporting surfaces (supporting the axial-direction tightening force) may not be the cam surfaces. Any supporting surface can be employed insofar as the handle arm 84 and the tubular member 87 can be relatively displaced by the axial-direction tightening force. In addition, the supporting surface may not necessarily have to be formed over the contact interface sites of the tubular member 87 and the handle arm 84, but the supporting surface may be formed in a part of the interface site.

The invention claimed is:

1. A fishing spinning reel comprising:
a driving shaft integrated with a drive gear;
a handle arm rotating in response to an operation of a handle;
a handle shaft axially supporting the handle arm in a pivotable manner on one end, rotating in response to the rotation of the handle arm, and divided from the driving shaft in an axial direction; and
a tubular member connected to each of the driving shaft and the handle shaft in an integrally rotatable manner, and including a first engagement portion engaged with an end surface of the driving shaft and a second engagement portion engaged with an end surface of the handle arm in a state where the handle is used,
wherein the driving shaft and the handle shaft are divided in the axial direction in the tubular member and each of the driving shaft and the handle shaft is inwardly fitted into the tubular member in an integrally rotatable manner.

2. The fishing spinning reel according to claim 1,
wherein a partitioning wall dividing the driving shaft from the handle shaft in an axial direction is formed in the tubular member, the first engagement portion is formed on a side surface of the partitioning wall on a drive gear side, and the second engagement portion is formed on an end surface of the tubular member on a handle arm side.

3. A fishing spinning reel comprising:
a driving shaft integrated with a drive gear;
a handle arm rotating in response to an operation of a handle;
a handle shaft axially supporting the handle arm in a pivotable manner on one end, rotating in response to the rotation of the handle arm, and inwardly fitted into the driving shaft in an integrally rotatable manner; and
a tubular member into which the handle shaft is inserted in a rotatable manner, the tubular member including a first engagement portion engaged with an end surface of the driving shaft and a second engagement portion engaged with an end surface of the handle arm in a state where the handle is used.

4. The fishing spinning reel according to claim 3,
wherein the driving shaft is inwardly fitted into the tubular member in a rotatable manner, and the first engagement portion is formed on a bottom surface of the tubular member where the driving shaft is inwardly fitted.

5. A fishing spinning reel comprising:
a driving shaft integrated with a drive gear;
a handle arm rotating in response to an operation of a handle;
a handle shaft axially supporting the handle arm in a pivotable manner in one end portion, rotating in response to the rotation of the handle arm, and arranged on one end of the driving shaft;
a tubular member interposed between the driving shaft and the handle arm and arranged to surround at least a part of the handle shaft; and
a connection shaft screwed with and inserted into the other end portion of the handle shaft from the other end of the driving shaft,
wherein inclined supporting surfaces are formed on the handle arm and the tubular member in contact with each other by screwing of the handle shaft and the connection shaft, and the handle arm and the tubular member are relatively displaced along the inclined supporting surfaces by the axial-direction tightening force caused by the screwing such that the handle arm and the handle shaft are pressed against and fixed to each other.

6. The fishing spinning reel according to claim 5,
wherein the handle arm and the tubular member are relatively displaced along the supporting surfaces in contact with each other by the axial-direction tightening force such that the tubular member and the handle shaft are pressed against and fixed to each other.

7. The fishing reel according to claim 6,
wherein an outer surface of the handle arm and an outer surface of the tubular member are flush in a state where the handle shaft is pressed against and fixed to the tubular member by the relative displacement between the handle arm and the tubular member.

8. The fishing reel according to claim 5,
wherein an outer surface of the handle arm and an outer surface of the tubular member are flush in a state where the handle shaft is pressed against and fixed to the handle arm by the relative displacement between the handle arm and the tubular member.

* * * * *